US007152158B2

(12) United States Patent
Watanabe et al.

(10) Patent No.: US 7,152,158 B2
(45) Date of Patent: Dec. 19, 2006

(54) PUBLIC KEY CERTIFICATE ISSUING SYSTEM, PUBLIC KEY CERTIFICATE ISSUING METHOD, INFORMATION PROCESSING APPARATUS, INFORMATION RECORDING MEDIUM, AND PROGRAM STORAGE MEDIUM

(75) Inventors: Hideaki Watanabe, Tokyo (JP); Yoshihito Ishibashi, Tokyo (JP); Shinako Matsuyama, Tokyo (JP); Ichiro Futamura, Kanagawa (JP); Masashi Kon, Kanagawa (JP); Makoto Oka, Chiba (JP)

(73) Assignee: Sony Corporation (JP)

( * ) Notice: Subject to any disclaimer, the term of this patent is extended or adjusted under 35 U.S.C. 154(b) by 744 days.

(21) Appl. No.: 10/040,436

(22) Filed: Jan. 9, 2002

(65) Prior Publication Data
US 2002/0108041 A1  Aug. 8, 2002

(30) Foreign Application Priority Data
Jan. 10, 2001  (JP) ............................ P2001-002221

(51) Int. Cl.
*H04L 9/14* (2006.01)
*H04L 9/30* (2006.01)
(52) U.S. Cl. ...................... 713/156; 713/175
(58) Field of Classification Search ................ 713/155, 713/156, 157, 175
See application file for complete search history.

(56) References Cited

U.S. PATENT DOCUMENTS

| 4,868,877 | A | * | 9/1989 | Fischer | 713/157 |
| 5,659,616 | A | * | 8/1997 | Sudia | 705/76 |
| 5,978,484 | A | * | 11/1999 | Apperson et al. | 705/54 |
| 6,157,721 | A | * | 12/2000 | Shear et al. | 380/255 |
| 6,438,690 | B1 | * | 8/2002 | Patel et al. | 713/156 |
| 2001/0002485 | A1 | * | 5/2001 | Bisbee et al. | 713/167 |

OTHER PUBLICATIONS

Whittle, R., "Public Authentication Framework: A Tutorial," whitepaper, First Principles Consulting, Jun. 1996.*
Chokhani, S., "Comment on RFC 2527," The Internet Society, Mar. 1999, pp. 1-7.*
Levi et al., "A Multiple Signature Based Certificate Verification Scheme," Proceedings of BAS'98, The Third Symposium on Computer Networks, Jun. 1998.*

* cited by examiner

*Primary Examiner*—Gilberto Barron, Jr.
*Assistant Examiner*—Andrew L. Nalven
(74) *Attorney, Agent, or Firm*—Rader Fishman & Grauer PLLC; Ronald P. Kananen

(57) ABSTRACT

The present invention provides a novel configuration which allows devices capable of processing different signature algorithms to mutually verify public key certificates. In this configuration, public key certificates storing plural signatures based on different signature algorithms such as RSA and ECC are issued and each device selects a signature which can be processed (namely, verified) by itself and verifies the selected signature. Consequently, the novel configuration allows the devices each being capable of verifying only a different signature algorithm to verify the public key certificates of the other devices, so that each device can perform public key certificate verification in the cross-certification and encrypted data communication not only with the other devices having public key certificates attached with signatures based on the same signature algorithm as that of each device, but also with the other devices or providers having public key certificates attached with signatures based on different signature algorithms from that of each device, thereby significantly enhancing the reliability in communication.

12 Claims, 23 Drawing Sheets

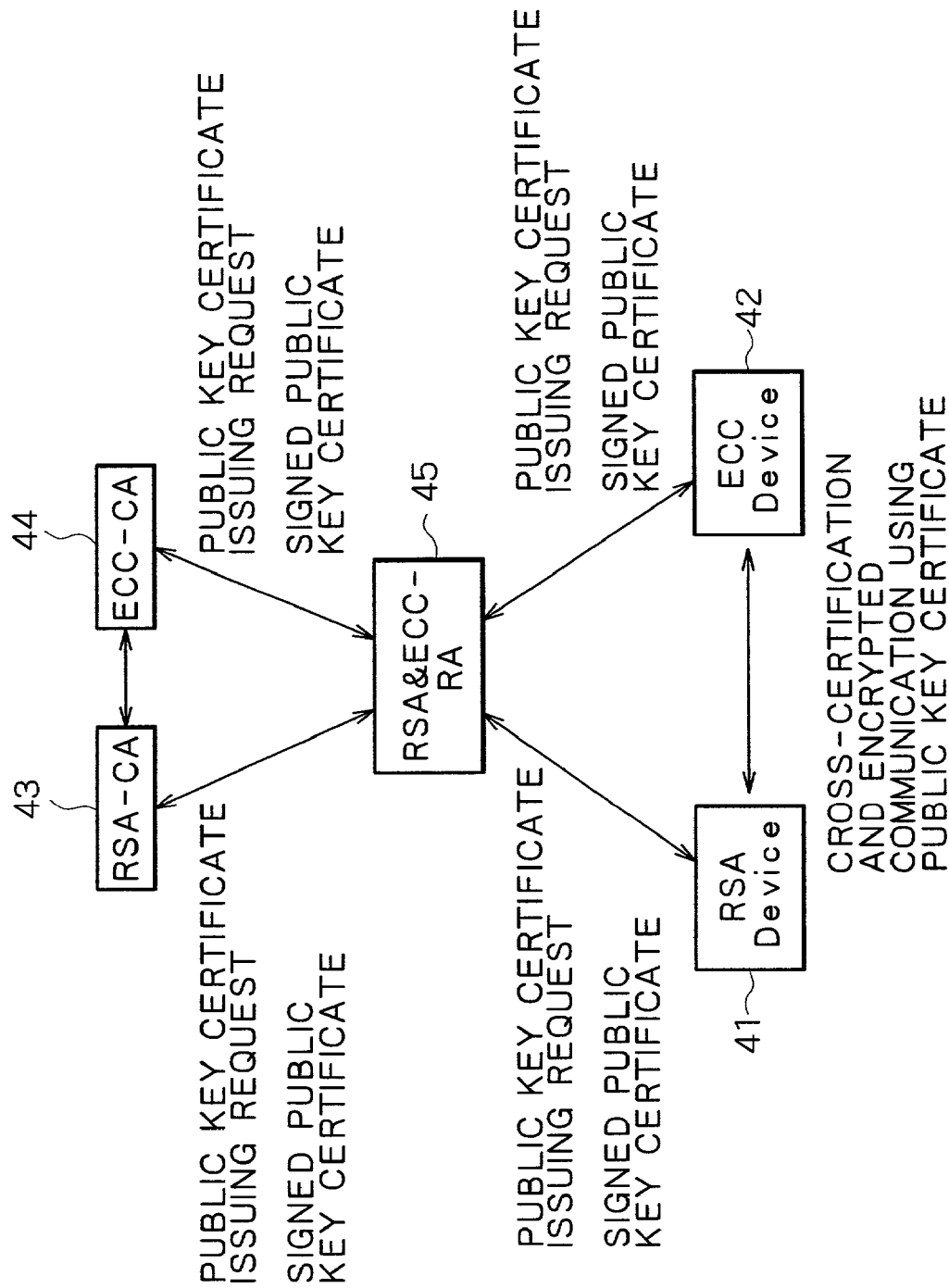

FIG. 5

EXAMPLE OF CERTIFICATE FORMAT (BASED ON X.509 V3)

| ITEMS | DESCRIPTION | SETTINGS WITH THIS IA |
|---|---|---|
| Version 1 | | |
| version | VERSION OF CERTIFICATE FORMAT | V3 |
| serial Number | CERTIFICATE SERIAL NUMBER FURNISHED BY IA | SEQUENTIAL SERIAL NUMBER |
| signature.algorithm Identifier algorithm parameters | CERTIFICATE SIGNATURE ALGORITHM AND PARAMETERS | ・ELLIPTIC CURVE CRYPTOGRAPHY OR RSA ・PARAMETERS IN THE CASE OF ELLIPTIC CURVE CRYPTOGRAPHY ・KEY LENGTH IN THE CASE OF RSA |
| issuer | IA NAME (DISTINGUISHED NAME FORMAT) | NAME OF THIS IA |
| validity notBefore notAfter | VALIDITY OF CERTIFICATE ・STARTING DATE AND TIME ・ENDING DATE AND TIME | |
| subject | USER IDENTIFICATION NAME | USER DEVICE ID OR SERVICE ENTITY ID |
| subject Public Key Info algorithm subject Public key | USER'S PUBLIC KEY INFORMATION ・KEY ALGORITHM ・PUBLIC KEY | ・ELLIPTIC CURVE CRYPTOGRAPHY OR RSA ・USER'S PUBLIC KEY |
| Version 3 | | |
| authority Key Identifier key Identifier authority Cert Issuer authority Cert Serial Number | ・KEY IDENTIFIER FOR SIGNATURE VERIFICATION BY IA ・KEY ID NUMBER (OCTAL) ・IA NAME (GENERAL NAME FORMAT) ・CERTIFICATE SERIAL NUMBER | |
| subject key Identifier | APPLICABLE WHERE MULTIPLE KEYS NEED TO BE CERTIFIED | NOT USED |
| key usage (0)digital Signature (1)non Repudiation (2)key Encipherment (3)data Encipherment (4)key Agreement (5)key CertSign (6)cRL Sign | THE PURPOSE OF KEY USAGE IS DESIGNATED (0)FOR DIGITAL SIGNATURE (1)FOR REPUDIATION PREVENTION (2)FOR KEY ENCRYPTION (3)FOR MESSAGE ENCRYPTION (4)FOR DISTRIBUTION OF COMMON KEY (5)FOR VERIFICATION OF SIGNATURE ON CERTIFICATE (6)FOR VERIFICATION OF SIGNATURE ON CERTIFICATE REVOCATION LIST | USAGE (0), (1), (4) AND (6) APPLY |
| private Key Usage Period notBefore notAfter | USAGE PERIOD OF USER'S PRIVATE KEY | USAGE PERIOD OF CERTIFICATE=USAGE PERIOD OF PUBLIC KEY=USAGE PERIOD OF PRIVATE KEY (DEFAULT) |

FIG. 6

| | | |
|---|---|---|
| policy Mappings<br>  issuer Domain Policy<br>  subject Domain Policy | NECESSARY ONLY WHEN CA IS CERTIFIED. AN ISSUER DOMAIN POLICY AND A SUBJECT DOMAIN POLICY ARE DEFINED. | NONE BY DEFAULT |
| supported Algorithms<br>  algorithm Identifier<br>  intended Usage<br>  intended Certificate Policies | ATTRIBUTES OF THE DIRECTORY (X.500) ARE DEFINED. WHEN THE OPPOSITE PARTY OF COMMUNICATION IS TO USE DIRECTORY INFORMATION, THAT PARTY IS INFORMED OF THE DIRECTORY ATTRIBUTES IN ADVANCE. | NONE BY DEFAULT |
| subject Alt Name | USER'S ALTERNATIVE NAME (GENERAL NAME FORMAT). | NOT USED |
| issuer Alt Name | THIS FIELD IS INCLUDED (NONE BY DEFAULT). | NONE BY DEFAULT |
| subject Directory Attributes | USER'S ANY ATTRIBUTES. | NOT USED |
| basic Constraints<br>  cA<br>  path Len Constraint | THIS FIELD SPECIFIES WHETHER THE PUBLIC KEY SUBJECT TO CERTIFICATION IS TO BE SIGNED BY THE CERTIFICATE AUTHORITY (CA) OR USED BY THE USER. | USED BY USER BY DEFAULT |
| name Constraints<br>  permitted Subtrees<br>    base<br>    minimum<br>    maximum<br>  excluded Subtrees | USED ONLY WHEN THE SUBJECT IS CA (CA CERTIFICATION). | NONE BY DEFAULT |
| policy Constraints<br>  require Explicit Policy<br>  inhibit Policy Mapping | DESCRIBED HERE ARE CONSTRAINTS REQUIRING EXPLICIT POLICY IDs AND INHIBIT POLICY MAPPING FOR THE REMAINING CERTIFICATION PATHS. | |
| CRL Distribution Points | DESCRIBED HERE ARE POINTS AT WHICH THE USER REFERENCES THE CERTIFICATE REVOCATION LIST (CRL) TO SEE WHETHER THE CERTIFICATE IS REVOKED. | THESE POINTS SERVE AS POINTERS INDICATING WHERE THE CERTIFICATE IS REGISTERED. THE CERTIFICATE REVOCATION LIST IS MANAGED BY THE ISSUER. |
| SIGNATURE | ISSUER'S SIGNATURE | |

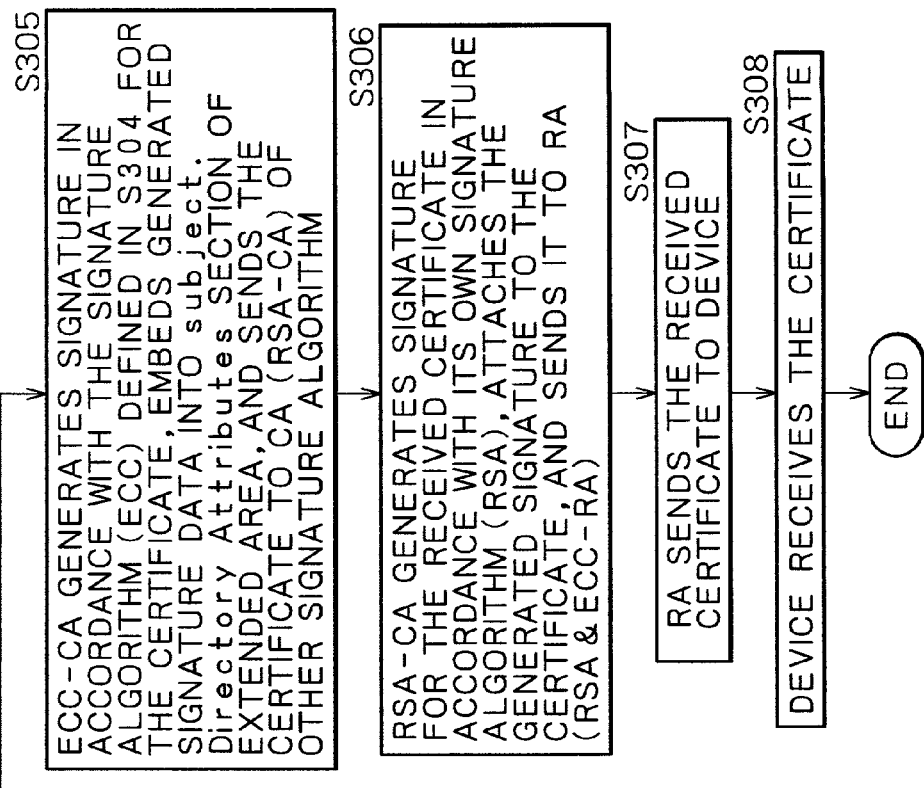
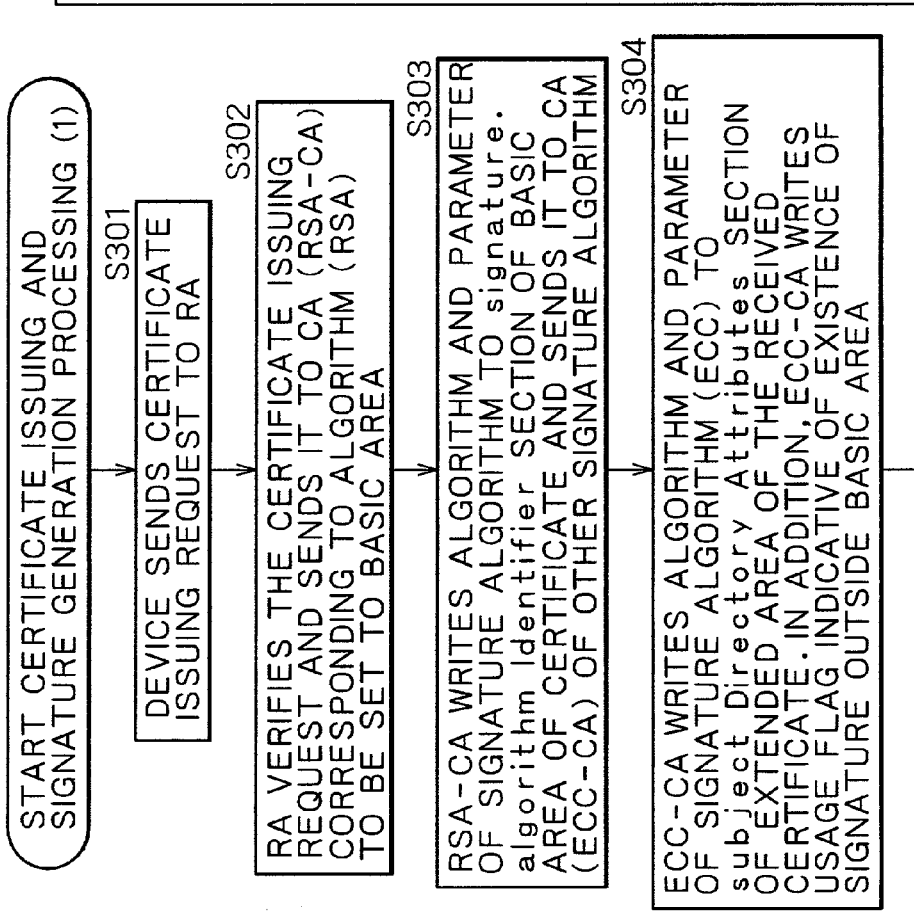
FIG. 14

PUBLIC KEY CERTIFICATE ISSUING SYSTEM, PUBLIC KEY CERTIFICATE ISSUING METHOD, INFORMATION PROCESSING APPARATUS, INFORMATION RECORDING MEDIUM, AND PROGRAM STORAGE MEDIUM

BACKGROUND OF THE INVENTION

The present invention relates generally to a public key certificate issuing system, a public key certificate issuing method, an information processing apparatus, an information recording medium, and a program storage medium which are associated with the issuance of a public key certificate for certifying the validity of a public key for use in encrypted data transmission in an electronic distribution system. Further, the present invention relates to a public key certificate issuing system, a public key certificate issuing method, an information processing apparatus, an information recording medium, and a program storage medium which are enhanced in the user-friendliness at the entities which use public key certificates issued by a certificate authority (CA) corresponding to a plurality of signature algorithms.

These days, various kinds of software data including game programs, audio data, image data, and document creating programs are distributed via communication networks including the Internet (these electrically distributed data are referred to as "content") . At the same time, network-based businesses such as online shopping are steadily gaining force.

In the network-based data communication such as mentioned above, the data sending side and the data receiving side authenticate with each other that each side is the authorized party of the communication of the other side before performing information transfer via the network. Namely, it is a general practice for each party of communication to have a data transfer configuration with data security taken into consideration. One of the techniques for implementing the security configuration in data transfer is transfer data encryption processing and data signature processing.

Encrypted data can be returned to decrypted data (or plain text), which is a readable message, by decryption processing based on a predetermined procedure. Data encryption and decryption methods for using an encryption key for encryption processing and a decryption key for decryption processing are well known.

There are various forms of the data encryption and decryption methods based on encryption and decryption keys. One of them is a so-called public key cryptosystem. In the public key cryptosystem, a message sender and a message recipient have different keys, one being a public key available to unspecified users while the other being a private key. For example, the data encryption key is used as the public key and the data decryption key as the private key; alternatively, an authentication code generating key is used as the private key while an authentication code decryption key as the public key.

Unlike a so-called common key cryptosystem in which a common key is used for both encryption and decryption, the public key cryptosystem is advantageous in the management of keys because only one particular person may have the private key, which must be kept secret. However, the public key cryptosystem is slower than the common key cryptosystem in data processing speed and therefore often used for such applications requiring only small amounts of data as the delivery of a private key and the execution of digital signature. A typical public key cryptosystem is RSA (Rivest-Sharmir-Adleman). RSA uses a product of very large two prime numbers (for example, 150 digits) to make it difficult to perform factorization (and discrete logarithm) on the product.

Another typical public key cryptosystem is elliptic curve cryptography (ECC), in which computations can be defined between points on an elliptic curve to create a similarity of discrete logarithmic problem (namely, elliptic curve discrete logarithmic problem).

While RSA cryptosystem based on factorization into prime factors (and discrete logarithm) has sub-exponential decryption, elliptic curve logarithm is considered to have only exponential decryption. While the key size of RSA cryptosystem based on discrete logarithmic problem is 512, 1024, or 2048 bits, the key size of ECC is 160, 192, or 224 bits, which provides generally the same level of security as that of RSA with a shorter key size, resulting in enhanced processing speed.

The public key cryptosystem is configured to allow unspecified users to use a public key and often uses a method of using a certificate for verifying whether a distributed public key is valid or not, the certificate being called a public key certificate. For example, user A generates a pair of public key and private key and sends the generated public key to a certificate authority to obtain a public key certificate therefrom. User A makes public this public key certificate. Unspecified users obtain the public key from the public key certificate through a predetermined procedure and encrypt a document by the obtained public key, sending the encrypted document to user A. User A decrypts the received encrypted document by the private key. Also, user A attaches a signature to a document for example by use of the private key and unspecified users obtain the public key from the public key certificate through a predetermined procedure to verify the signature.

The following describes a public key certificate with reference to FIG 1. A public key certificate is issued by a certificate authority (CA) or an issuer authority (IA) in the public key cryptosystem. The public key certificate is prepared by a user submitting his ID and public key to a certificate authority and this certificate authority then attaching its ID, validity and signature to the information submitted by the user.

The public key cryptosystem shown in FIG. 1 includes certificate's version number, certificate's serial number allocated by a certificate authority to a certificate's user, the algorithm and parameter of the above-mentioned RSA or ECC used for digital signature, the name of the certificate authority, certificate's validity, the name (user ID) of user of the certificate authority, and the public key and digital signature of this user.

The digital signature is generated over all of certificate's version number, certificate's serial number allocated by a certificate authority to a certificate's user, the algorithm and parameter of the above-mentioned RSA or ECC used for digital signature, the name of the certificate authority, certificate's validity, the name of user of the certificate authority, and the public key of the user. For example, the digital signature consists of data generated by generating a hash value on the basis of a hash function and applying the private key of the certificate authority to the generated hash value.

The certificate authority issues the public key certificate as shown in FIG. 1, updates an invalidated public key certificate, and creates, manages, and distributes a list of users who made unauthorized access in order to exclude these users (this is called revocation). Also, the certificate authority generates a public key and a private key as required.

On the other hand, when using this public key certificate, the user uses the public key of the certificate authority held by him, verifies the digital signature of this public key certificate, and, if the verification is successful, takes the public key from the public key certificate to use the public key. Therefore, the users of the public key certificate must all hold the public key of a common certificate authority.

In a data transmission system based on the public key cryptosystem which uses the public key certificate issued by a certificate authority as described above, the digital signature of the public key certificate is verified and, if the verification is successful, the public key is taken out of the public key certificate. By use of this public key, the user can execute the certification processing based on public key cryptosystem or the transfer data encryption or decryption processing based on public key cryptosystem. However, the entities such as user devices that execute various processing operations based on public key cryptosystem are rarely compatible with all of various cryptosystem algorithms such as ECC and RSA described above; in many cases, these entities can only execute processes which are compatible with either ECC algorithm or RSA algorithm.

The devices which can execute only a single cryptosystem algorithm or particular cryptosystem algorithms can use only the public key certificates which have a signature algorithm or algorithms based on that cryptosystem algorithm or the particular cryptosystem algorithms. Therefore, if these devices receive a public key certificate signed with a different algorithm, they cannot verify the signature, being incapable of executing public key certificate verification.

Conventionally, as shown in FIG. 2 for example, an ECC device 23 which can process ECC algorithm sends a public key certificate issuing request or an update request to an ECC registration authority (ECC-RA) 22 which executes signature processing based on ECC algorithm. The ECC registration authority 22 certifies the entities and devices participating in each service, receives a public key certificate issuing request from each device, and sends the received request to the ECC certificate authority (ECC-CA) 21 which executes signature processing based on ECC algorithm. In response, the ECC certificate authority (ECC-CA) 21 issues a public key certificate on which the signature processing based on ECC algorithm has been executed and distributes this public key certificate to the ECC device 23 via the ECC registration authority 22.

On the other hand, a RSA device 33 capable of processing RSA algorithm sends a public key certificate issuing request or an update request to a RSA registration authority (RSA-RA) 32 which executes the signature processing based on RSA algorithm. The RSA registration authority 32 certifies the entities and devices participating in each service, receives a public key certificate issuing request from each device, and sends the received request to a RSA certificate authority (RSA-CA) 31 which executes signature processing based on RSA algorithm. In response, the RSA certificate authority (RSA-CA) 31 issues a public key certificate on which the signature processing based on RSA algorithm has been executed and distributes this public key certificate to the RSA device 33 via the RSA registration authority 32.

Thus, processing blocks corresponding to two or more different signature algorithms are constructed and certification and encrypted data communication are executed based on the public key cryptosystems which are closed to the systems built in these processing blocks.

The ECC device 23 cannot verify the signature of a public key certificate signed with RSA algorithm received from the RSA device 33, so that the ECC device 23 cannot verify the validity of the received public key certificate, which therefore does not provide the function as a certificate. Conversely, the RSA device 33 cannot verify the signature of a public key certificate signed with ECC algorithm received from the ECC device 23, being incapable of verifying the validity of the received public key certificate.

In order for the ECC device 23 and the RSA device 33 shown in FIG. 2 to verify the validity of the public key certificate of each other, a configuration must be used where the ECC device 23 and the RSA device 33 send the public key certificates received from each other to the ECC registration authority 22 and the RSA registration authority 32 and then to the ECC certificate authority (ECC-CA) 21 and the RSA certificate authority (RSA-CA) 31 respectively. Inquiries are executed between the ECC certificate authority (ECC-CA) 21 and the RSA certificate authority (RSA-CA) 31, and the inquiry results are sent to the devices in place of certification.

The above-mentioned configuration is shown in FIG. 3. In order to execute cross-certification with the ECC device 23, the RSA device 33 sends the public key certificate of its own to the ECC device 23. This public key certificate is signed by the RSA certificate authority (RSA-CA) 31. Because the ECC device 23 cannot verify the certificate issued the RSA certificate authority (RSA-CA) 31, the ECC device 23 inquires the ECC certificate authority (ECC-CA) 21 for the validity of the certificate via the ECC registration authority (ECC-RA) 22.

The ECC certificate authority (ECC-CA) 21 inquires the RSA certificate authority (RSA-CA) 31 for the validity of the certificate. Further, the RSA certificate authority (RSA-CA) 31 confirms the validity of the certificate and returns the result to the ECC certificate authority (ECC-CA) 21. Next, the ECC certificate authority (ECC-CA) 21 returns the result to the ECC device 23 via the ECC registration authority (ECC-RA) 22. The ECC device 23 certifies the RSA device 33 by confirming the validity of the certificate.

As described, end entities (EEs) having public key certificates based on different signature algorithms cannot cross-certify each other, so that the related-art technology has a drawback of having to perform the above-mentioned processing in data communication.

SUMMARY OF THE INVENTION

It is therefore an object of the present invention to solve the above-mentioned problems in data communication systems based on public key cryptosystem using public key certificates. In order to achieve the object, the present invention provides a public key certificate issuing system, a public key certificate issuing method, an information processing apparatus, an information recording medium, and a program storage medium which allow the valid usage of public key certificates between devices processing different signature algorithms by supporting plural encryption algorithms and issuing public key certificates based on these algorithms to issue signed public key certificates based on plural signature algorithms which are available at the devices such as ECC and RSA devices to which only particular encryption algorithms can be applied.

In carrying out the invention and according to a first aspect thereof, there is provided a public key certificate issuing system including: a certificate authority for issuing a public key certificate of an entity which uses the public key certificate; and a registration authority for sending a public key certificate issuing request received from an entity under control to the certificate authority; the certificate authority being constituted by a plurality of certificate authorities each executing a different signature algorithm, transferring a public key certificate between the plurality of certificate authorities in response to the public key certificate issuing request received from the registration authority, attaching a digital signature on message data constituting the public key certificate in accordance with the different signature algorithm at each certificate authority, and issuing a multi-signed public key certificate storing a plurality of signatures based on different signature algorithms.

Preferably, in the above-mentioned public key certificate issuing system, the plurality of certificate authorities include a Rivest-Shamir-Adleman (RSA) certificate authority for executing signature generation processing based on a RSA signature algorithm and an elliptic curve cryptography (ECC) certificate authority for executing signature generation processing based on an ECC algorithm, the signatures stored in the multi-signed public key certificate including a signature based on the RSA signature algorithm and a signature based on the ECC signature algorithm.

Preferably, in the above-mentioned public key certificate issuing system, at least one of the plurality of certificate authorities has a configuration for executing processing of storing a generated signature and signature information including signature algorithm information associated with the generated signature into an extended area of the public key certificate.

Preferably, in the above-mentioned public key certificate issuing system, at least one of the plurality of certificate authorities has a configuration for executing processing of storing a generated signature into an area other than a basic area and an extended area of the public key certificate and storing signature information including signature algorithm information associated with the generated signature into the extended area.

Preferably, in the above-mentioned public key certificate issuing system, at least one of the plurality of certificate authorities has a configuration for executing processing of storing, into the public key certificate, flag information indicating whether at least two signatures are included in the public key certificate.

In carrying out the invention and according to a second aspect thereof, there is provided a public key certificate issuing method having a certificate authority for issuing a public key certificate of an entity which uses the public key certificate and a registration authority for sending a public key certificate issuing request received from an entity under control to the certificate authority to issue the public key certificate in response to the public key certificate issuing request from the registration authority, the certificate authority being constituted by a plurality of certificate authorities each executing a different signature algorithm, transferring a public key certificate between the plurality of certificate authorities in response to the public key certificate issuing request received from the registration authority, attaching a digital signature on message data constituting the public key certificate in accordance with the different signature algorithm at each certificate authority, and issuing a multi-signed public key certificate storing a plurality of signatures based on different signature algorithms.

Preferably, in the above-mentioned public key certificate issuing method, at least one of the plurality of certificate authorities executes a step of generating a signature for a signed public key certificate by applying a signature algorithm which is different from that attached to the signed public key certificate and attaching the generated signature to the signed public key certificate.

Preferably, in the above-mentioned public key certificate issuing method, the plurality of certificate authorities include a Rivest-Shamir-Adleman (RSA) certificate authority for executing signature generation processing based on a RSA signature algorithm and an elliptic curve cryptography (ECC) certificate authority for executing signature generation processing based on an ECC signature algorithm, the RSA certificate authority executes signature generation processing based on the RSA signature algorithm, the ECC certificate authority executes signature generation processing based on the ECC signature algorithm, and the multi-signed public key certificate, including a signature based on the RSA signature algorithm and a signature based on the ECC signature algorithm, is issued.

Preferably, in the above-mentioned public key certificate issuing method, at least one of the plurality of certificate authorities executes processing of storing a generated signature and signature information including signature algorithm information associated with the generated signature into an extended area of the public key certificate.

Preferably, in the above-mentioned public key certificate issuing method, at least one of the plurality of certificate authorities executes processing of storing a generated signature into an area other than a basic area and an extended area of the public key certificate and storing signature information including signature algorithm information associated with the generated signature into the extended area.

Preferably, in the above-mentioned public key certificate issuing method, at least one of the plurality of certificate authorities executes processing of storing, into the public key certificate, flag information indicating whether at least two signatures are included in the public key certificate.

In carrying out the invention and according to a third aspect thereof, there is provided an information processing apparatus for executing verification of a public key certificate, having a configuration for selecting, from among a plurality of signature algorithms recorded in signature information stored in a basic area and an extended area of the public key certificate, a signature algorithm which can be verified by the information processing apparatus and executing signature verification on the basis of the selected signature algorithm.

In carrying out the invention and according to a fourth aspect thereof, there is provided an information processing apparatus for executing verification of a public key certificate, including a signature verification capability based on a plurality of signature algorithms.

Preferably, in the above-mentioned information processing apparatus, the plurality of signature algorithms include a RSA signature algorithm and an ECC signature algorithm.

In carrying out the invention and according to a fifth aspect thereof, there is provided an information recording medium recording a public key certificate storing a public key, the public key certificate storing signatures based on a plurality of signature algorithms.

Preferably, in the above-mentioned information recording medium, the plurality of signature algorithms include a RSA signature algorithm and an ECC signature algorithm.

In carrying out the invention and according to a sixth aspect thereof, there is provided a program storage medium for providing a computer program for executing public key certificate issuing processing for issuing a public key certificate of an entity which uses the public key certificate, the computer program including the step of generating, with the use of a signature algorithm different from that of a first signature attached to the public key certificate, a second signature and attaching the second signature to the public key certificate.

It should be noted that the program storage medium associated with the sixth aspect of the invention provides computer programs in a computer-readable form to general-purpose computer systems which can execute various program codes, by way of example. This medium includes recording media such as CD (compact disc), FD (floppy disc), and MO (magneto-optical disc) and a transmission media such as networks and is not restricted to any particular media.

The program storage medium described above defines a cooperative relationship in structure or function between the computer program and the providing medium in order to implement the computer program capabilities on computer systems. In other words, this cooperative function is brought out on computer systems by installing computer programs into the systems through the providing medium, thereby achieving the same effects as those of the other aspects of the invention.

Other objects and aspects of the invention will become apparent from the following description of embodiments with reference to the accompanying drawings.

BRIEF DESCRIPTION OF THE DRAWINGS

These and other objects of the invention will be seen by reference to the description, taken in connection with the accompanying drawing, in which:

FIG. 4 is a schematic diagram illustrating an outline of a public key certificate issuing system according to the present invention;

FIG. 5 is a diagram (1) illustrating the detail of a data structure of a public key certificate;

FIG. 6 is a diagram (2) illustrating the detail of the data structure of the public key certificate;

FIG. 14 is a flowchart (example 1) describing public key certificate issuing and signature processing procedures;

DETAILED DESCRIPTION OF THE PREFERRED EMBODIMENTS

Figure 1:
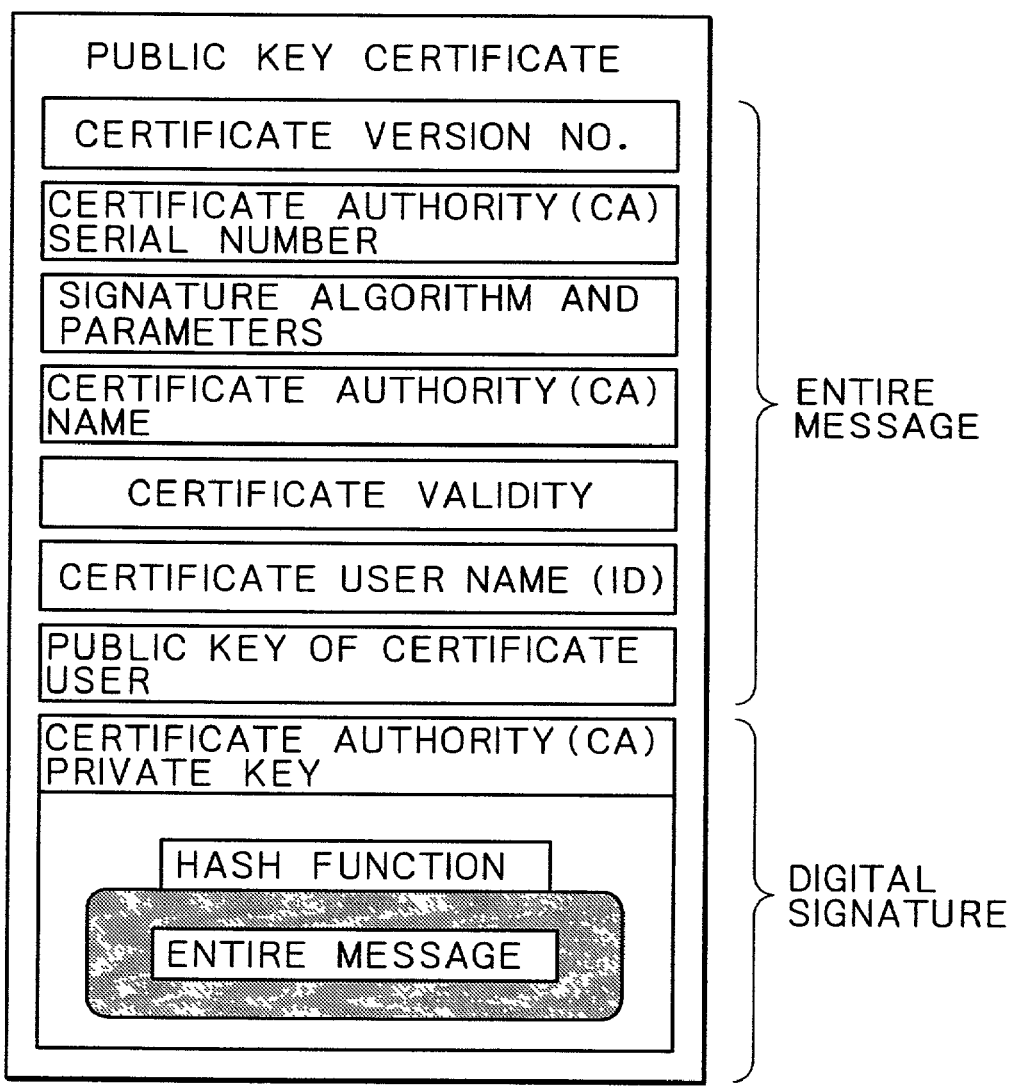
FIG. 1 illustrates an example of a general public key certificate.
Figure 2:
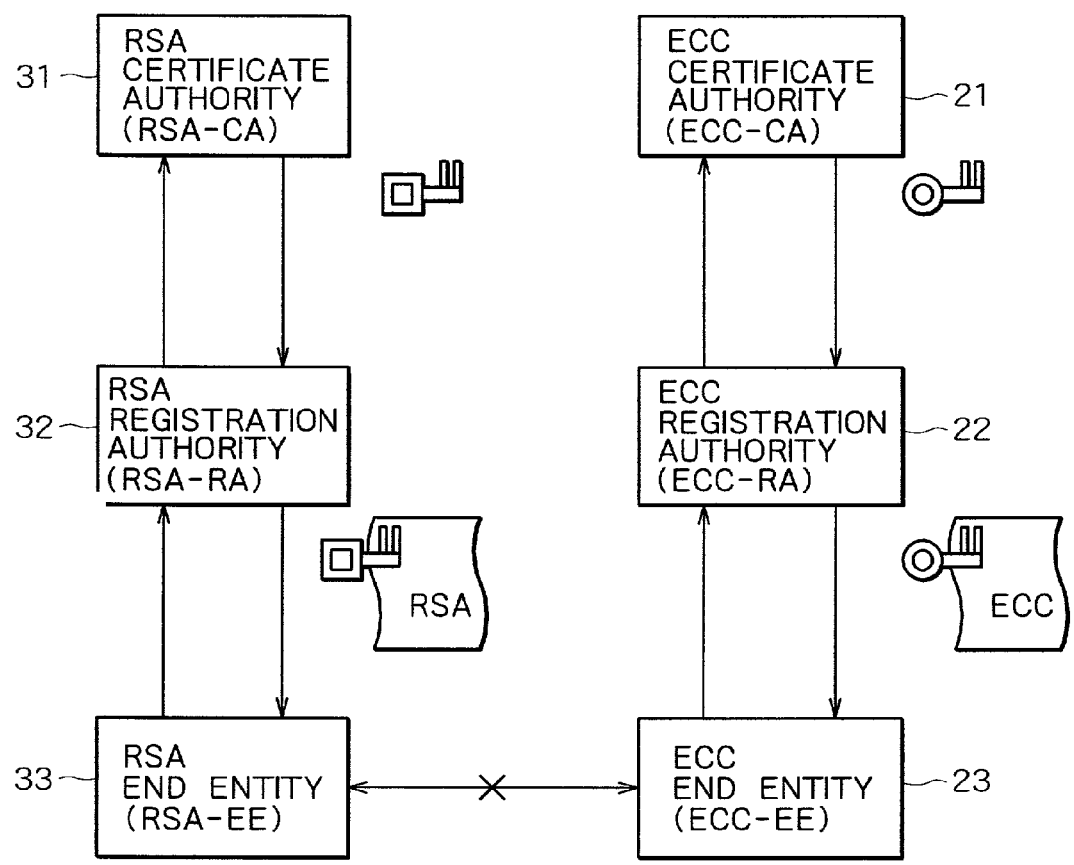
FIG. 2 is a schematic diagram illustrating an outline of a related-art public key certificate issuing system.
Figure 3:
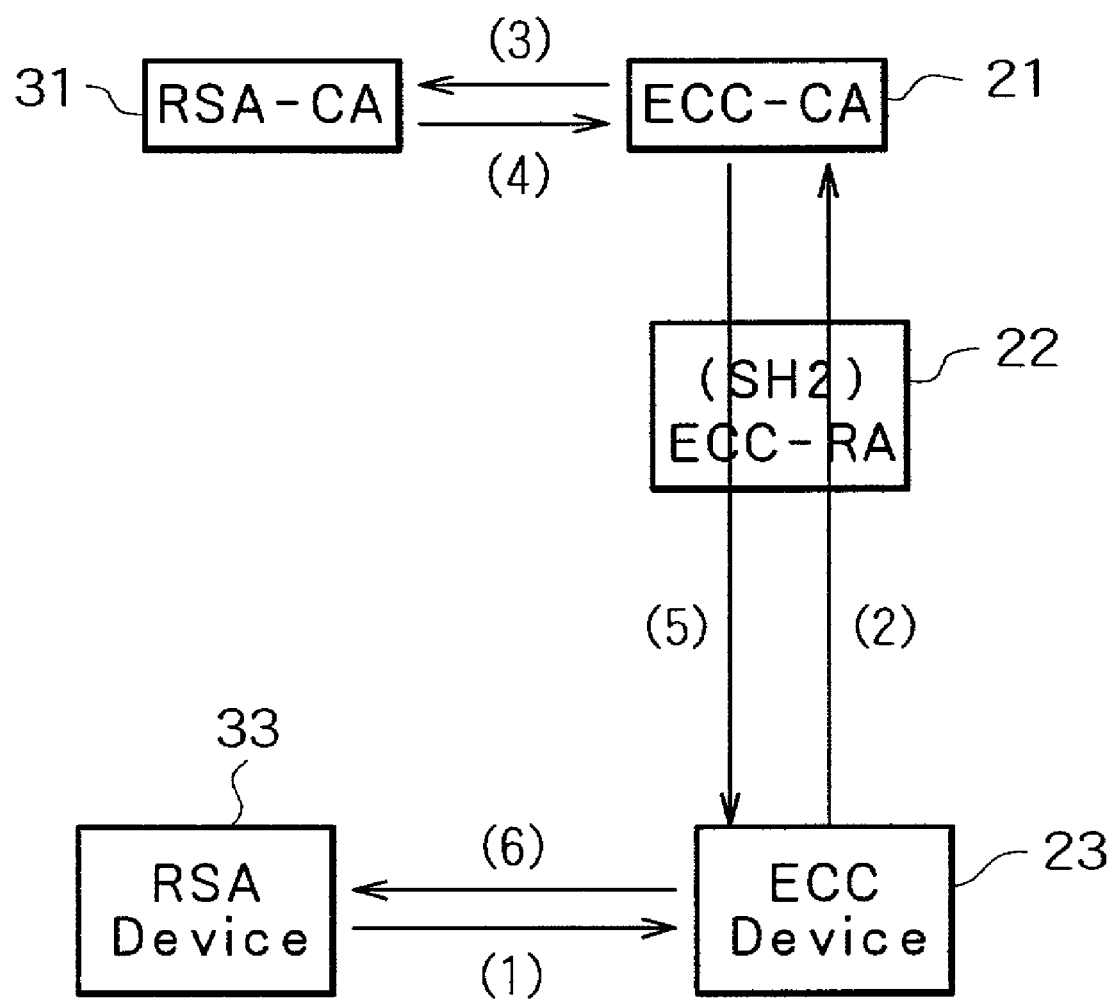
FIG. 3 is a schematic diagram illustrating an outline of certification processing by use of a public key certificate issued by the related-art public key certificate issuing system.

This invention will be described in further detail by way of example with reference to the accompanying drawings. First, the terms used in the following description of embodiments will be defined.

"Certificate authority (CA)" denotes an institution which prepares and issues public key certificates.

"Registration authority (RA)" denotes an institution which performs the registering operation necessary for issuing public key certificates. When requested by such end entities (EEs) which use public key certificates as users, service providers, or servers for issuing public key certificates, the registration authority (RA) requests the certificate authority (CA) for issuing the requested certificate and passes the issued certificate to the requesting end entities (EEs).

"Hardware security module (HSM)" denotes a dedicated hardware unit which holds signature keys and signs certificates by use of these keys.

"End entity (EE)" denotes an entity to which a public key certificate is issued. To be more specific, an end entity is a device, a server, a user, or a service provider which uses a public key certificate.

Outline of System Configuration:

First, public key certificate issuing processing, signature processing, and usage processing in the configuration according to the invention will be outlined. Referring to FIG. 4, a RSA device 41 can execute the processing (or verification) of RSA signature algorithm and an ECC device 42 can execute the processing (or verification) of ECC signature algorithm.

A RSA certificate authority (RSA-CA) 43 attaches a certificate authority signature based on RSA signature algorithm to a public key certificate to issue a signed public key certificate. An ECC certificate authority (ECC-CA) 44 attaches a certificate authority signature based on ECC signature algorithm to a public key certificate to issue a signed public key certificate.

A RSA & ECC registration authority (RSA&ECC-RA) 45 accepts a public key certificate issuing request from each end entity (device), requests the RSA certificate authority (RSA-CA) 43 and the ECC certificate authority 44 for preparing a public key certificate attached with two certificate authority signature based on RSA signature algorithm and ECC signature algorithm, and sends the prepared public key certificate to each requesting end entity.

Consequently, each of the end entities, namely, the RSA device 41 and ECC device 42, comes to have the public key certificate having two certificate authority signatures based on RSA signature algorithm and ECC signature algorithm issued through the RSA & ECC registration authority (RSA&ECC-RA) 45.

In order to perform cross-certification based on public key cryptosystem, the RSA device 41 and ECC device 42 send their public key certificates to each other. Each device selects, from the plural signatures in the public key certificate received from the other device, the signature which is based on the algorithm which can be verified by it's own device, verifies the selected signature to confirm the validity of the received public key certificate, takes out the public key of the other device from the public key certificate, and executes a cross-certification procedure.

In this signature verification processing, the RSA device 41 takes the RSA signature from the public key certificate having plural signatures and executes the verification processing based on RSA signature algorithm, while the ECC device 42 takes the ECC signature from the public key certificate having plural signatures and executes the verification processing based on ECC signature algorithm, thereby verifying the validity of the public key certificate received by each device.

In the system according to the present invention, signature verification is realized by sending the public key certificates to each other of the devices which can process different signature algorithms.

Public Key Certificate:

The following describes the details of a public key certificate which is applicable to the present invention. A public key certificate is verified by a third party, namely the certificate authority, the issuer of the public key certificate, that a public key for use in the transfer of encrypted data based on the public key or the cross-certification between two parties which transfer data is the public key of the authorized users. The detailed configuration of the public key certificate used in the system of the present invention will be described with reference to FIGS. 5 and 6. An exemplary format of a public key certificate is based on public key certificate format X.509 V3.

"version" is a field in which the version of the public key certificate format is recorded.

"serial Number" is a field in which the serial number allocated to each public key certificate by the certificate authority is recorded.

"signature.algorithm Identifier algorithm parameters" is a field in which the signature algorithm and its parameters of the public key certificate are recorded. It should be noted that the signature algorithms include elliptic curve cryptography (ECC) and Rivest-Shamir-Adleman cryptosystem (RSA). When ECC is used, parameters and key length are recorded. When RSA is used, key length is recorded. If another cryptosystem is used, its identifier is recorded.

"issuer" denotes a field in which the entity which issued this public key certificate, namely, the name of the certificate authority is recorded in an identifiable form ("Distinguished name").

"validity" is a field in which the starting date and time and ending date and time of the public key certificate are recorded.

"subject" is a field in which the name of the user to be verified is recorded. To be more specific, the ID of a user device or the ID of a service providing entity, for example.

"subject Public Key Info algorithm subject Public key" is a field in which the key algorithm as user's public key information and the key information itself are stored.

The above-mentioned fields are included in the public key certificate format X.509 V1. The following fields are additional to this format.

"authority Key Identifier—key Identifier, authority Cert Issuer, authority Cert Serial Number" is a field in which the information for identifying the key of certificate authority, namely, key identifier (octadecimal), the name of certificate authority, and certificate number are recorded.

"subject key Identifier" is a field in which an identifier for identifying each of two or more keys which are to be verified in the public key certificate.

"key usage" is a field in which (0) digital signature, (1) preventing repudiation, (2) enciphering key, (3) enciphering message, (4) distributing common key, (5) verifying certificate signature, and (6) verifying certificate revocation list signature are set.

"private Key Usage Period" is a field in which the validity of the private key owned by user is recorded.

"certificate Policies" is a field in which the certificate issuing policies of certificate authority and registration authority (RA) are recorded. For example, these policies include the policy ID and certification standard based on ISO/IEC9384-1.

"policy Mappings" is a field which is recorded only when certifying a certificate authority (CA) and specifies the mappings of the policy of the certificate authority which issues the public key certificate and the subject domain policy.

"supported Algorithms" is a field which defines the attribute of directory (X.500). This field is used to send the attribute of the directory information to the mate of communication before the mate uses the directory information.

"subject Alt Name" is a field in which the alternative name of user is recorded.

"issuer Alt Name" is a field in which the alternative name of certificate issuer is recorded.

"subject Directory Attributes" is a field in which a given attribute of user is recorded. In the configuration according to the present invention, this field may record signature algorithm associated with second signature, parameter information, and second signature.

"basic Constraints" is a field for determining whether the public key to be certified is for certificate authority signature or of user.

"name Constraints permitted Substrees" is a field indicative of a valid area of the certificate authority which is used only when the subject is a certificate authority.

"policy Constraints" is a field in which the constraints requiring certificate policy ID and inhibit policy map explicit to the rest of certification path are written.

"Certificate Revocation List Distribution Points" is a field in which a reference point to a revocation list is used for checking if the certificate to be used by user is revoked or not.

"Signature" is a field in which the signature of certificate authority is written.

It should be noted that, in the configuration according to the present invention, not only one signature based on one signature algorithm but also two or more signatures based on different signature algorithms are attached to each public key certificate. This multi-signature configuration will be described later herein.

Signature Algorithms:

The above-mentioned signature of a public key certificate is a digital signature which is executed on the data of the public key certificate by use of the private key of the certificate authority. Each user of the public key certificate can verify the public key certificate for its validity and alteration by use of the public key of the certificate authority.

First, the digital signature algorithm based on elliptic curve cryptography (ECC) will be described with reference to FIG. 7. Shown in FIG. 7 is a flowchart describing the generation of digital signature data by use of EC-DSA (Elliptic Curve Digital Signature Algorithm IEEE P1363/D3).

Figure 7:
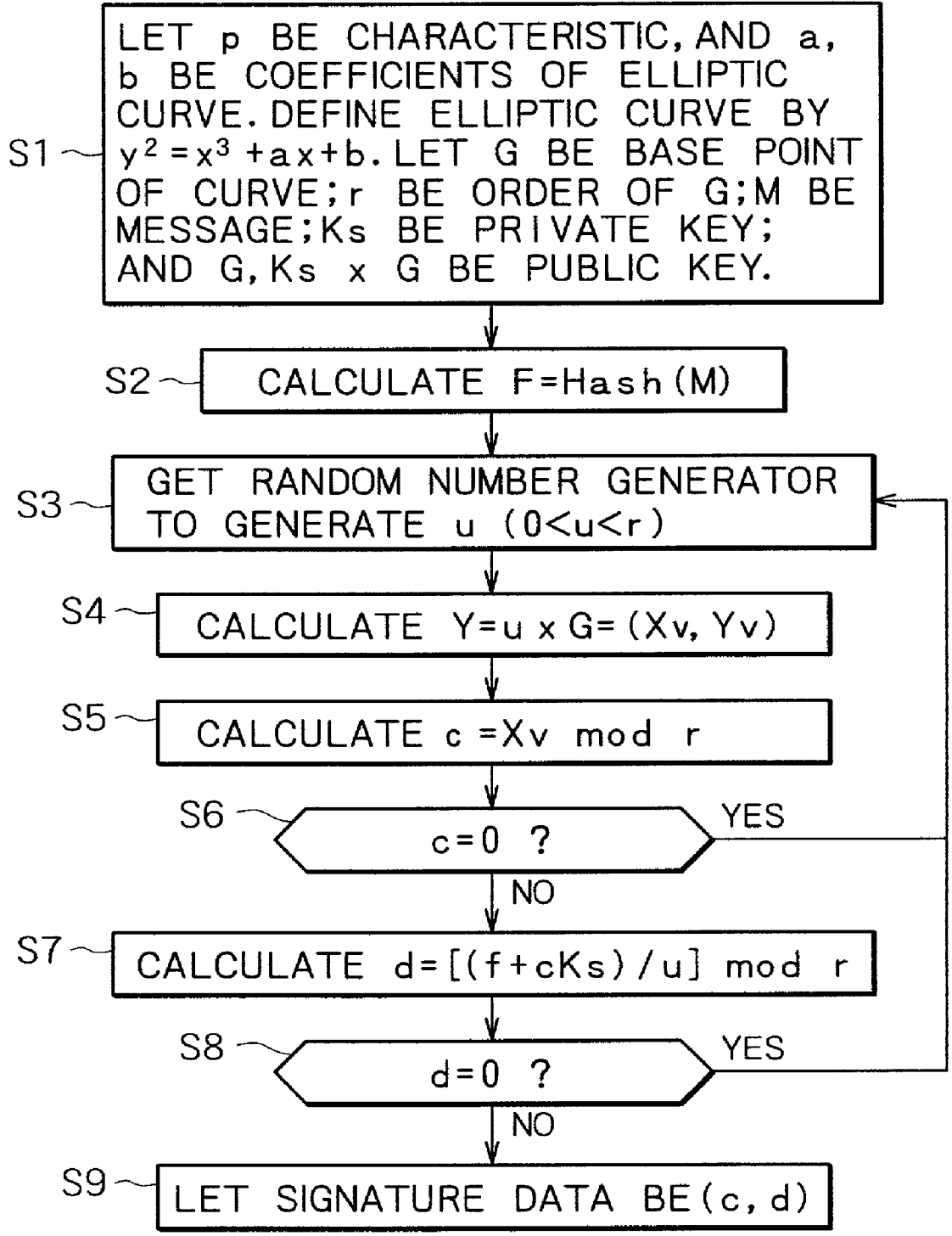
FIG. 7 is a flowchart describing a procedure of ECC signature generation processing.

Referring to FIG. 7, in step S1, let "p" be characteristic, "a" and "b" be coefficients of elliptic curve ($4a^3+27b^2 \neq 0$ (mod p), "G" be base point on elliptic curve, "r" be order of G, and "Ks" be private key ($0<Ks<r$). In step S2, a hash value of message M is computed to provide f=Hash(M).

The following describes a method of obtaining a hash value by use of a hash function. A hash function compresses an inputted message to data having a predetermined bit length and outputs the compressed data as a hash value. A hash function is characterized by the fact that it is difficult to infer an input from a hash value (the output) and, when one bit of the data inputted in the hash function changes, many bits of the hash value change, and it is difficult to find different input data that have the same hash value. Hash functions may include MD4, MD5, and SHA-1. DES-CBC may also be used. In this case, MAC (check value, which is equivalent to ICV) providing the final output value becomes a hash value.

In step S3, random number u ($0<u<r$) is generated. In step S4, coordinates V (Xv, Yv) obtained by multiplying the base point by u is computed. It should be noted that the addition and doubling on an elliptic curve are defined as follows:

Let $P=(Xa,Ya)$, $Q=(Xb,Yb)$, $R=(Xc,Yc)=P+Q$, then, when $P \neq Q$ (addition), $Xc=\lambda^2-Xa-Xb$ $Yc=\lambda \times (Xa-Xc)-Ya$ $\lambda=(Yb-Ya)/(Xb-Xa)$;

when $P=Q$ (doubling), $Xc=\lambda^2-2Xa$ $Yc=\lambda \times (Xa-Xc)-Ya$ $\lambda=(3(Xa)^2+a)/(2Ya)$.

By use of these addition and doubling, a value obtained by multiplying point G by u is computed (to be specific, the following computation method which is easy to understand at the cost of speed is used: G, 2×G, 4×G, and so on are computed and $2^i \times G$ (a value obtained by doubling G i times (where, i represents the bit position as counted from the LSB of u)) corresponding to the position where 1 is given as a result of binary expansion of u is added to a value obtained by the computation.

In step S5, c=Xv mod r is computed. In step S6, whether or not the result of this computation is 0. If the decision is No, then, in step S7, d=[(f+cKs)/u] mod r is computed. In step S8, whether or not d is 0. If the decision is No, then, in step S9, c and d are outputted as digital signature data. If r be 160 bits, then the digital signature data are 320 bits long.

If c=0 in step S6, then the procedure returns to step S3, in which a new random number is generated. Likewise, if d=0 in step S8, the procedure returns to step S3 to generate a new random number.

Figure 8:
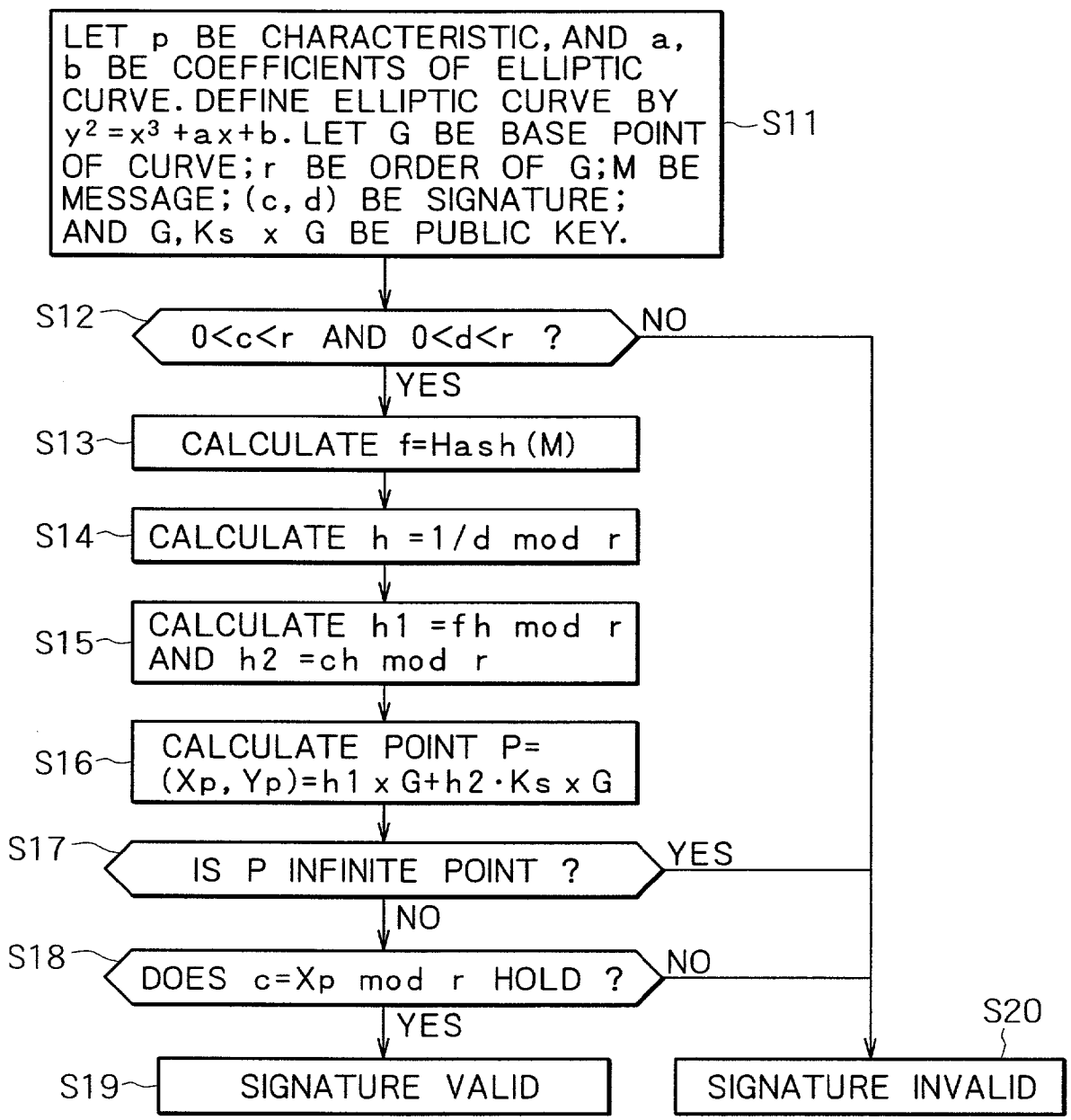
FIG. 8 is a flowchart describing a procedure of ECC signature verification processing.

The following describes a method of verifying ECC-based digital signatures with reference to FIG. 8. In step S11, let "M" be a message, "p" be characteristic, "a" and "b" be coefficients of elliptic curve ($y^2=x^3+ax+b$), "G" be a base point on elliptic curve, "r" be order of G, and "G" and "Ks×G" be public keys ($0<Ks<r$). In step S12, whether or not digital signature data c and d satisfy $0<c<r$ and $0<d<r$ respectively. If the decision is Yes, then, in step S13, a hash value of message M is computed to provide f=Hash(M). Next, in step S14, h=1/d mod r is computed. In step S15, h1=fh mod r and h2=ch mod r are computed.

In step S16, point P=(Xp, Yp)=h1 ×G +h2□Ks ×G by use of computed hi and h2. Since the digital signature verifier knows public keys G and Ks ×G, scalar multiple of the point on elliptic curve can be computed as with step S4 shown in FIG 7. In step S17, it is determined whether or not point P is an infinite point. If the decision is No, the procedure goes to step S18 (actually, the decision of infinite point can be done in step S16; namely, is addition of P=(X, Y) and Q=(X, −Y) is made, λcannot be computed, so that P+Q results in an infinite point). In step S18, Xp mod r is computed to be compared with digital signature data c. Finally, if a match is found in this comparison, the procedure goes to step S19 to determine that this digital signature is valid.

If the digital signature is found valid, it indicates that the data have not been tampered, which in turn indicates that the entity holding the private key corresponding to the public key has generated the digital signature.

If, in step S12, the digital signature data c or d is found not satisfying $0<c<r$ or $0<d<r$ respectively, then the procedure goes to step S20. If, in step S17, point P is found to be an infinite point, the procedure also goes to step S20. If, in step S18, the value of Xp mod r is found not matching the digital data c, the procedure also goes to step S20.

If, in step S20, the digital signature is found invalid, it indicates that the data has been tampered or the entity holding the private key corresponding to the public key has not generated this digital signature.

Figure 9:
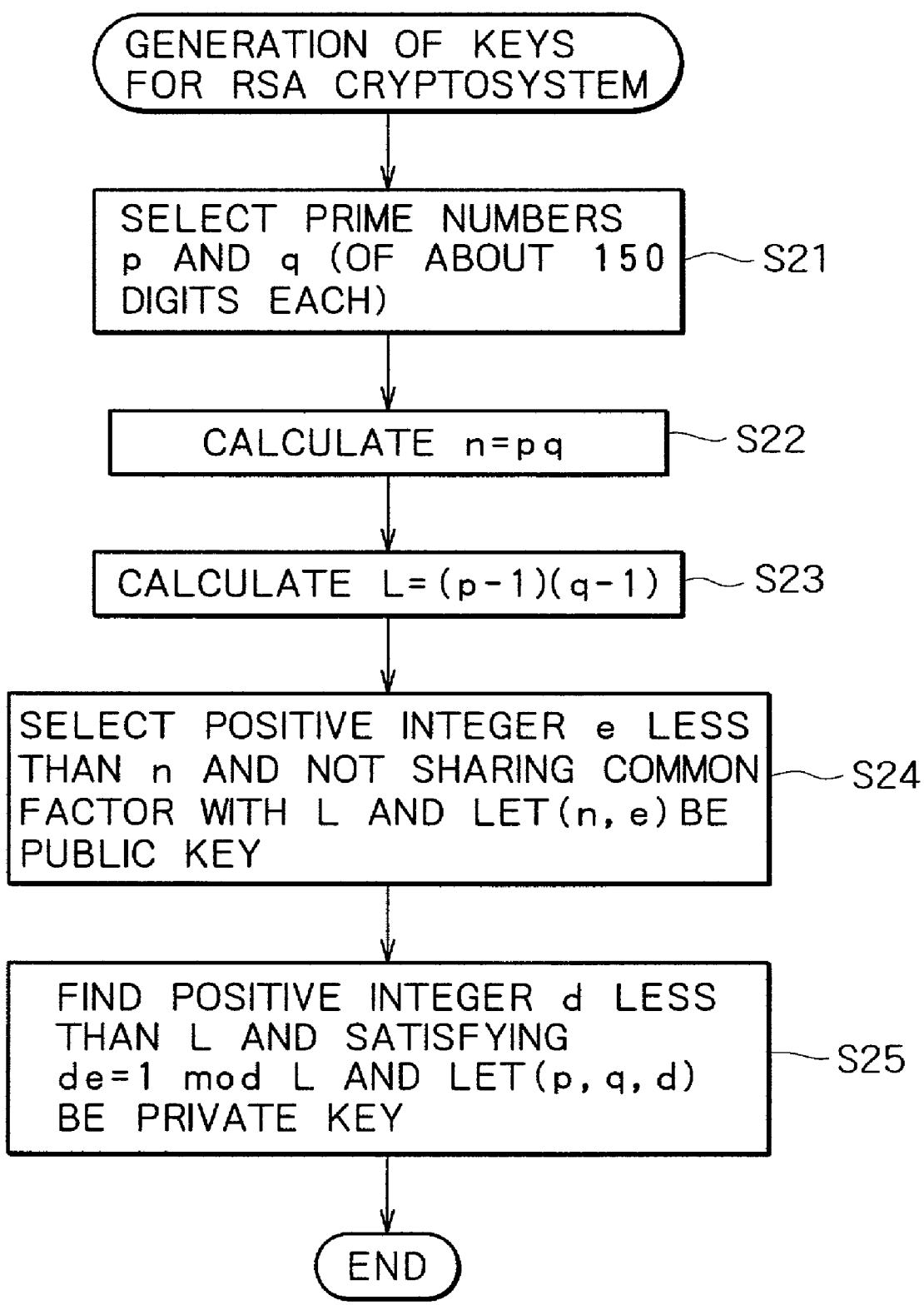
FIG. 9 is a flowchart describing a procedure of generating keys necessary for RSA signature processing.
Figure 10A:
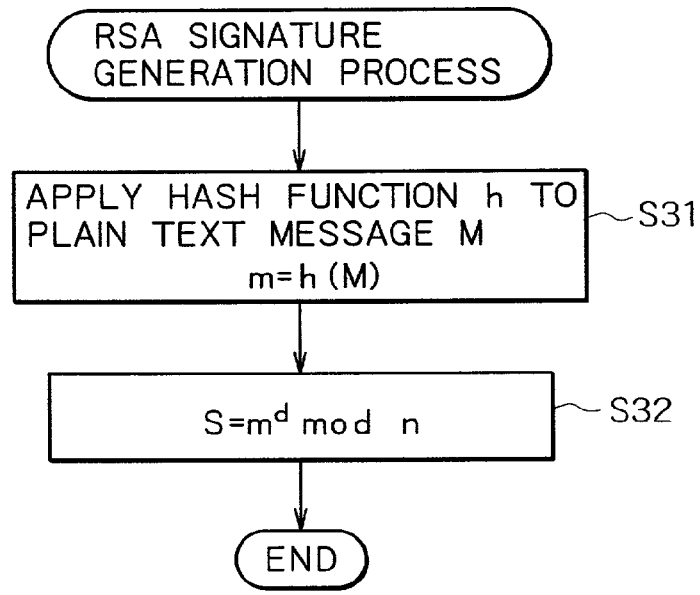
FIGS. 10A and 10B are flowcharts describing procedures of RSA signature generation processing and verification processing respectively.
Figure 10B:
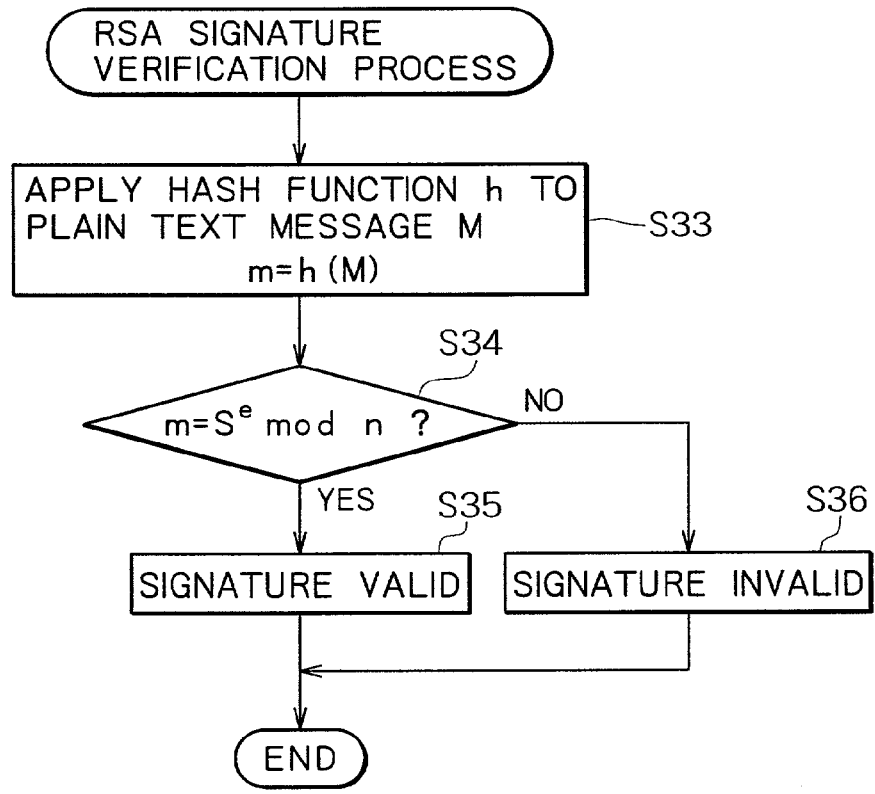

The following describes a signature algorithm based on RSA cryptosystem with reference to FIG. 9 and FIGS. 10A and 10B. FIG. 9 shows a method of generating a digital signature based on RSA cryptosystem and a public key and a private key for verifying this digital signature. FIG. 10A shows digital signature generation processing and FIG. 10B shows digital signature verification processing.

Referring to FIG. 9, in step S21, prime numbers p and q (about 150 digits each) are selected. In step S22, n=pq is computed. In step S23, L=(p−1) (q−1) is computed. In step S24, positive integer e less than n having no common factor with L is selected to use (n, e) as a public key. In step S25, positive integer d satisfying de=1 mod L is obtained to use (p, q, d) as a private key.

The generation and verification of a digital signature by use of a public key and a private key are performed as shown in the flowchart shown in FIGS. 10A and 10B. Referring to FIG. 10A, in step S31, hash function h is applied to message M to be signed to generate m=h(M). In step S32, S=$m^d$ mod n is generated to use S as a signature.

Referring to FIG. 10B, in step S33, hash function h is applied to message M to be verified to generate m=h(M). In step S34, it is determined whether or not m=$S^e$ mod n is established. If the decision is Yes, it is determined that the signature is valid in step S35.

If the signature is found valid, it indicates that the data has not been tampered, which in turn indicates that the entity holding the private key corresponding to the public key has generated the digital signature.

If, in step S34, m=S$^e$ mod n is found not established, then, in step S36 it is determined that the signature is invalid, which indicates that the data has been tampered or this digital signature was not generated by an entity which holds the private key corresponding to the public key.

As described, the signature verification can verify the validity of each public key certificate. For the signature verification, the encryption processing based on the signature algorithm used is required and the signature algorithm must be executable in the device of an end entity concerned. Generally, under the management of a registration authority (RA), a common signature algorithm is used.

Figure 11:
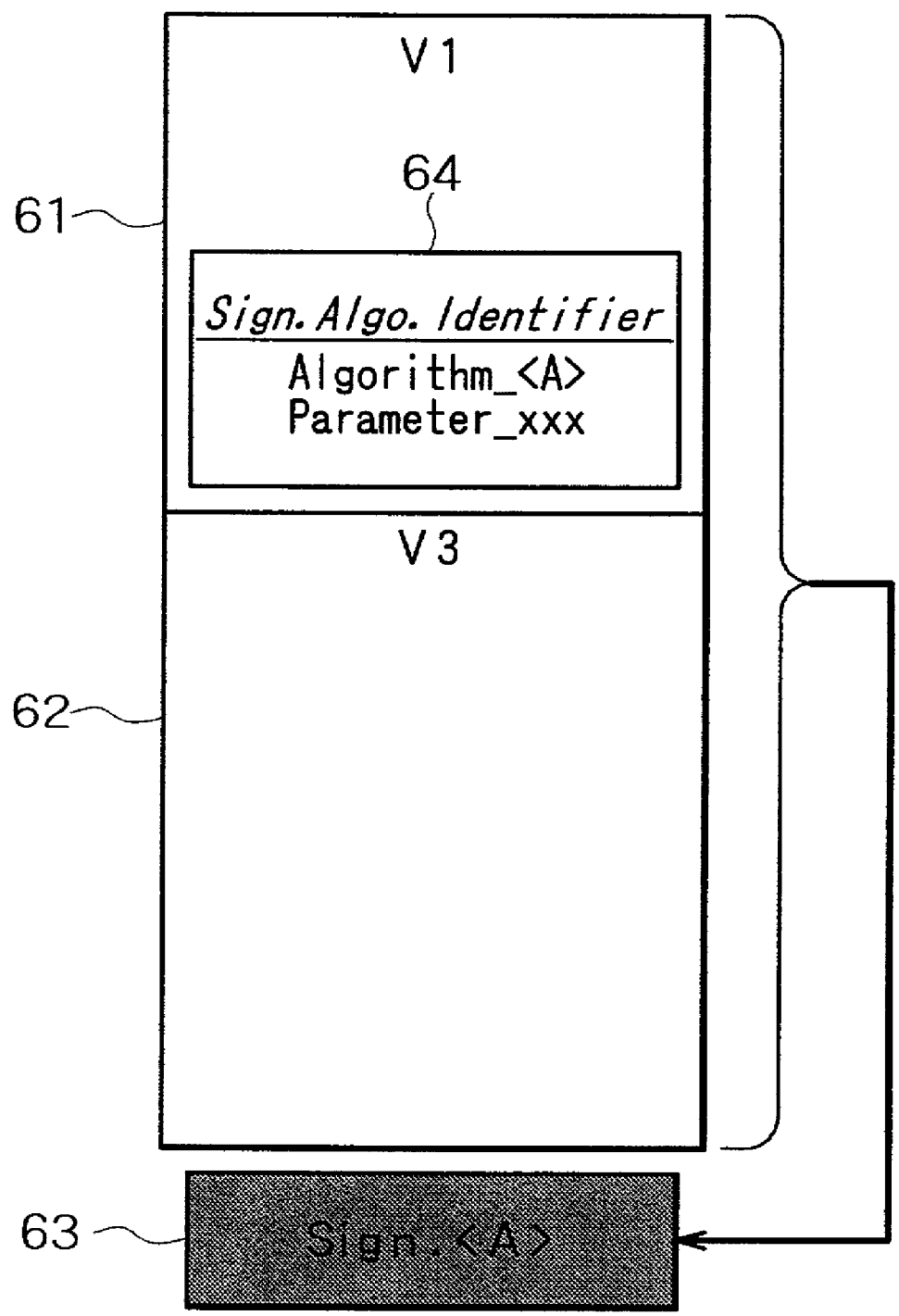
FIG. 11 illustrates an exemplary configuration of a public key certificate and exemplary signature processing (1)

Signature Processing Forms:

FIG. 11 shows a signature processing form for a general public key certificate. As described, each public key certificate has a basic area (V1 area) 61 constituted by basic data and an extended area (V3 area) 62 constituted by extended data. A digital signature is generated by applying the above-mentioned elliptic curve cryptography (ECC) or the RSA signature generating method with the data obtained from all of the basic area (V1 area) 61 and extended area (V3 area) 62 used as a message. The results of the signature generation processing are recorded to a signature area 63. It should be noted that the information such as the signature generating algorithm and parameters are recorded to a signature information area 64 of the basic area (V1 area) 61.

Figure 12:
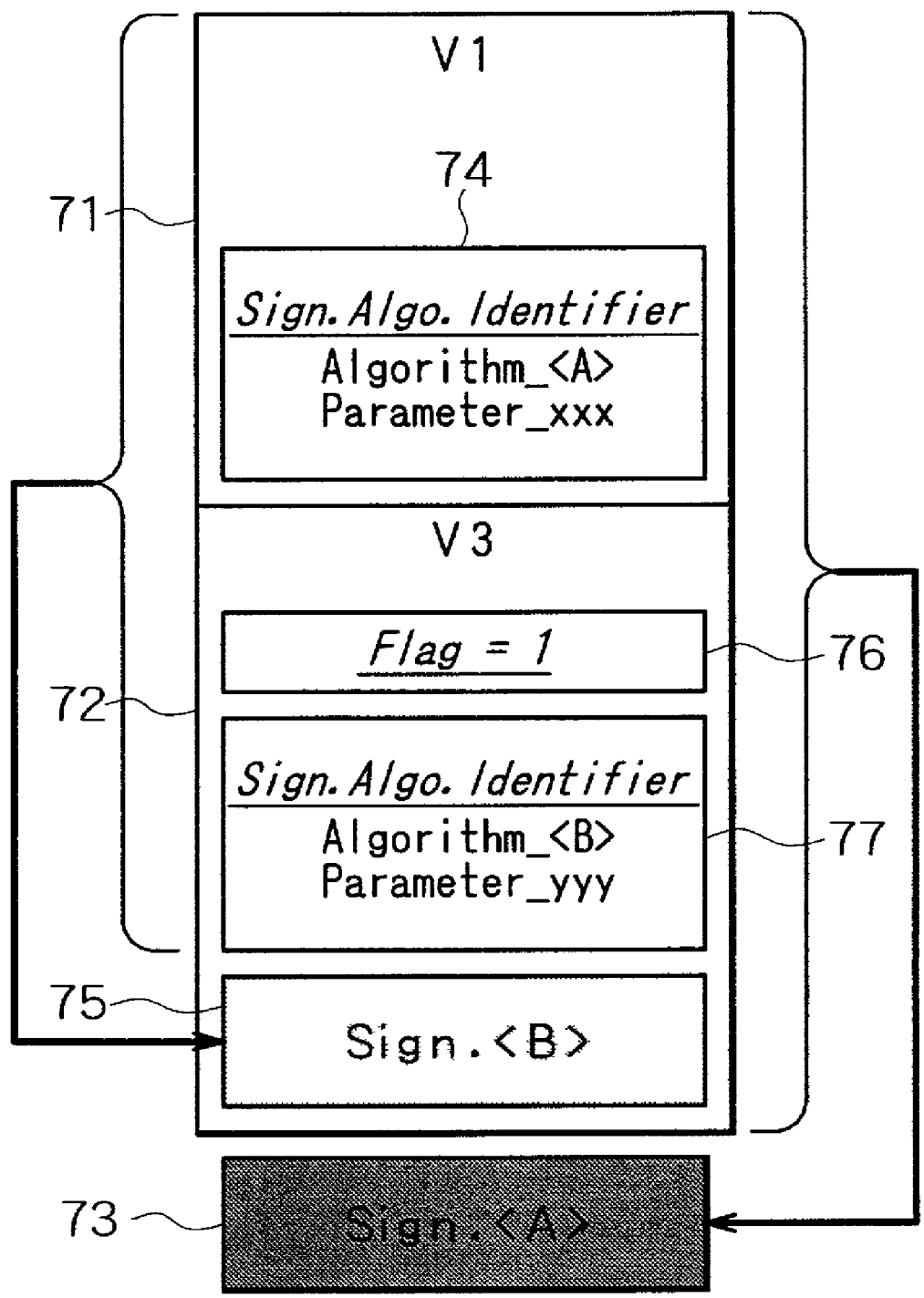
FIG. 12 illustrates an exemplary configuration of a public key certificate and exemplary signature processing
Figure 13:
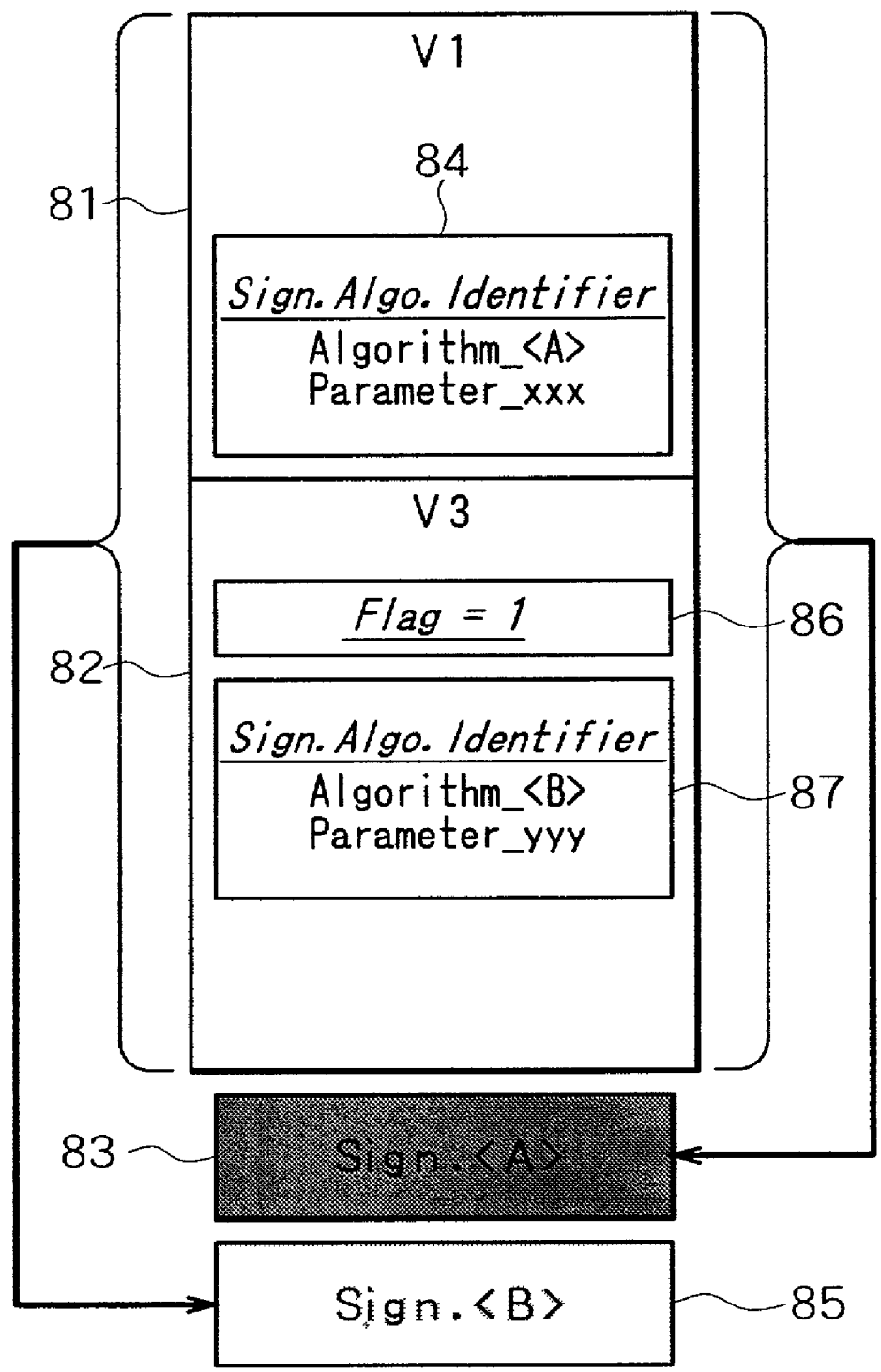
FIG. 13 illustrates an exemplary configuration of a public key certificate and exemplary signature processing (3)

The following describes the public key certificate signature processing forms according to the present invention with reference to FIGS. 12 and 13. First, a configuration shown in FIG. 12 is described. The public key certificate shown in FIG. 12 has a basic area (V1 area) 71 constituted by basic data and an extended area (V3 area) 72 constituted by extended data as with the public key certificate shown in FIG. 11. A signature area A 73 indicates a signature as with the configuration shown in FIG. 11, which records a signature generated by applying an algorithm such as the above-mentioned elliptic curve cryptography (ECC) or the RSA signature generating method with the data obtained from the all of the basic area (V1 area) 71 and the extended area (V3 area) 72 used as a message. The information such as the signature generating algorithm and parameters associated with the signature to be stored in the signature area A 73 is recorded to a signature information area 74 in the basic area (V1 area) 71.

A signature area B 75 provides a digital signature which has been generated as a message from the data obtained from all of the basic area (V1 area) 71 and extended area (V3 area) 72 by applying a signature algorithm other than that stored in the signature area A 73. The signature area B 75 is stored in the extended area (V3 area) 72. For example, signature area B 75 may be stored in the subject Directory Attributes field of the extended area (V3 area) 72. Alternatively, the signature area B 75 may be stored in another data recordable field.

In addition, the extended area (V3 area) 72 stores flag information 76 indicating whether a digital signature based on a signature algorithm other than that supporting the normal digital signature (the signature in the signature area A 73) and signature information area 77 stores information such as the signature generating algorithm and parameters associated with the digital signature stored in the signature area B 75. The signature area B 75 is stored in the extended area (V3 area) 72. For example, the signature information area 77 may be stored in the subject Directory Attributes field of the extended area (V3 area) 72. Alternatively, the signature information area 77 may be stored in another data recordable field.

If the flag=1, the flag information 76 denotes that the signature area B 75 stores a digital signature generated by applying a signature algorithm other than that for the digital signature stored in the signature area A 73. If the flag=0, the flag information 76 denotes that the signature area B 75 stores no digital signature.

To be more specific, if the digital signature in the signature area A 73 is based on ECC algorithm for example, the digital signature in the signature area B 75 is that based on RSA algorithm and vice versa.

In the example shown in FIG. 12, the extended area (V3 area) 72 stores a second digital signature based on an algorithm other than that of the signature area A 73. In addition, the extended area (V3 area) 72 may store two or more digital signatures generated by applying an algorithm, a key length, or a parameter other than those mentioned above. In this case, a 2-bit flag may be defined as "00" for no second signature, "01" for a second signature present, and "10" for a third signature present, for example, thus indicating there are two or more signatures. Also, the signature information area 77 may store the information in the number of items corresponding to the number of signatures stored.

As described, in the signature verification of a public key certificate having two or more signatures based on different signature algorithms, if the signature stored in the signature area A 73 is based on ECC algorithm and the signature stored in the signature area B 75 is based on RSA algorithm for example, then the device of each end entity (EE) capable of performing only the verification based on ECC algorithm can execute the signature verification of the signature area A 73 and the device of each end entity (EE) capable of performing only the verification based on RSA algorithm can execute the signature verification of the signature area B 75, thereby realizing the cross-certification between the ECC device and the RSA device.

The following describes the format of a multi-signed certificate shown in FIG. 13. As with the public key certificate shown in FIG. 12, the public key certificate shown in FIG. 13 has a basic area (V1 area) 81 constituted by basic data and an extended area (V3 area) 82 constituted by extended data. A signature area A 83 stores a signature generally the same in configuration as that shown in FIG. 12, which has been generated by applying the above-mentioned ECC or RSA signature generating algorithm with the data obtained from all of the basic area (V1 area) 81 and extended area (V3 area) 82 used as a message. The information such as the signature generating algorithm and parameters associated with the signature stored in the signature area A 83 is recorded to a signature information area 84 in the basic area (V1 area) 81.

Further, a signature area B 85 stores a signature generated by applying a signature algorithm other than that of the signature stored in the signature area A 83 with the data obtained from all of the basic area (V1 area) 81 and extended area (V3 area) 82 used as a message. In the configuration shown in FIG. 13, the signature area B 85 is stored outside the extended area (V3 area) 82. In the extended area (V3 area) 82, flag information 86 indicating whether a signature based on an algorithm other than the normal signature (in the signature area A 83) is stored and the information such as the signature generating algorithm and parameters associated with the signature stored in the signature area B 85 are stored in a signature information area 87. The meanings of the flag information are the same as those shown in FIG. 12.

In the example shown in FIG. 13, as with shown in FIG. 12, a second signature based on an algorithm other than the signature algorithm in the signature area A 83 is stored in the signature area B 85. The signature area B 85 may also store a signature generated on the basis of a still different algorithm, key length or parameter. In addition, the configuration shown in FIG. 13 may provide signature areas C and D for example.

In the configuration shown in FIG. 13, as with the configuration shown in FIG. 12, a public key certificate having two or more signatures based on different signature generating algorithms is generated. Consequently, the signature verification can be performed between the devices of end entities (EEs) each of which can perform the verification by only one type of signature algorithm, thereby realizing the cross-certification between the ECC device and the RSA device.

Public Key Certificate Issuing and Signature Generation Processing:

The following describes public key certificate issuing and signature generation processing by use of the example shown in FIG. 12 or 13 in which a public key certificate having two or more digital signatures generated on the basis of different signature generating algorithms is generated.

First, the processing of issuing a multi-signed public key certificate and processing of generating its signatures shown in FIG. 12 will be described with reference to the flowchart shown in FIG. 14.

In step S301, a device requesting the issuing of a public key certificate sends a public key certificate issuing request to a registration authority (RA). It should be noted that the registration authority (RA) is a registration authority (RSA&ECC-RA) which can accept a request for issuing a public key certificate having two signatures generated on the basis of RSA signature algorithm and ECC signature algorithm.

Receiving the public key certificate issuing request, the registration authority (RSA&ECC-RA) checks and registers the public key certificate issuing requesting device and then sends the public key certificate issuing request to an certificate authority (RSA-CA) corresponding to a signature algorithm (in this example, RSA) to be set to the basic area of the public key certificate in step S302. In this processing example, the first signature is based on RSA algorithm and the second signature on ECC algorithm. It will be apparent that the first signature is based on ECC algorithm and the second signature on RSA algorithm.

The certificate authority (RSA-CA) which has received the public key certificate issuing request from the registration authority generates the requested public key certificate. In doing so, the registration authority (RA) sets RSA algorithm as the signature generating algorithm and its parameters to the basic area of the public key certificate. Further, in step S303, the certificate authority (RSA-CA) sends the generated public key certificate to an certificate authority (ECC-CA) which executes the signature generation processing based on another algorithm.

Receiving the public key certificate data from the certificate authority (RSA-CA), the certificate authority (ECC-CA) sets the signature information such as ECC algorithm and its parameters to the subject Directory Attributes field of the extended area of the received public key certificate and sets a flag indicating that there is a second signature in step S304. It should be noted that the signature information may be stored in any other data recordable area than the subject Directory Attributes field.

Next, the certificate authority (ECC-CA) generates a digital signature from the data (or a message) of the public key certificate on the basis of ECC algorithm. The generated digital signature is stored in the subject Directory Attributes field of the extended area. When the signature generation and storage processing have been completed, the certificate authority (ECC-CA) sends the public key certificate to the certificate authority (RSA-CA) in step S305.

Receiving the public key certificate data from the certificate authority (ECC-CA), the certificate authority (RSA-CA) generates a digital signature from the public key certificate data (or message) on the basis of RSA algorithm, stores the generated digital signature into the signature field of the public key certificate, and sends the resultant public key certificate to the registration authority in step S306.

The registration authority sends the received public key certificate to the requesting device in step S307 and the device stores the received public key certificate into its storage means in step S308.

Figure 15:
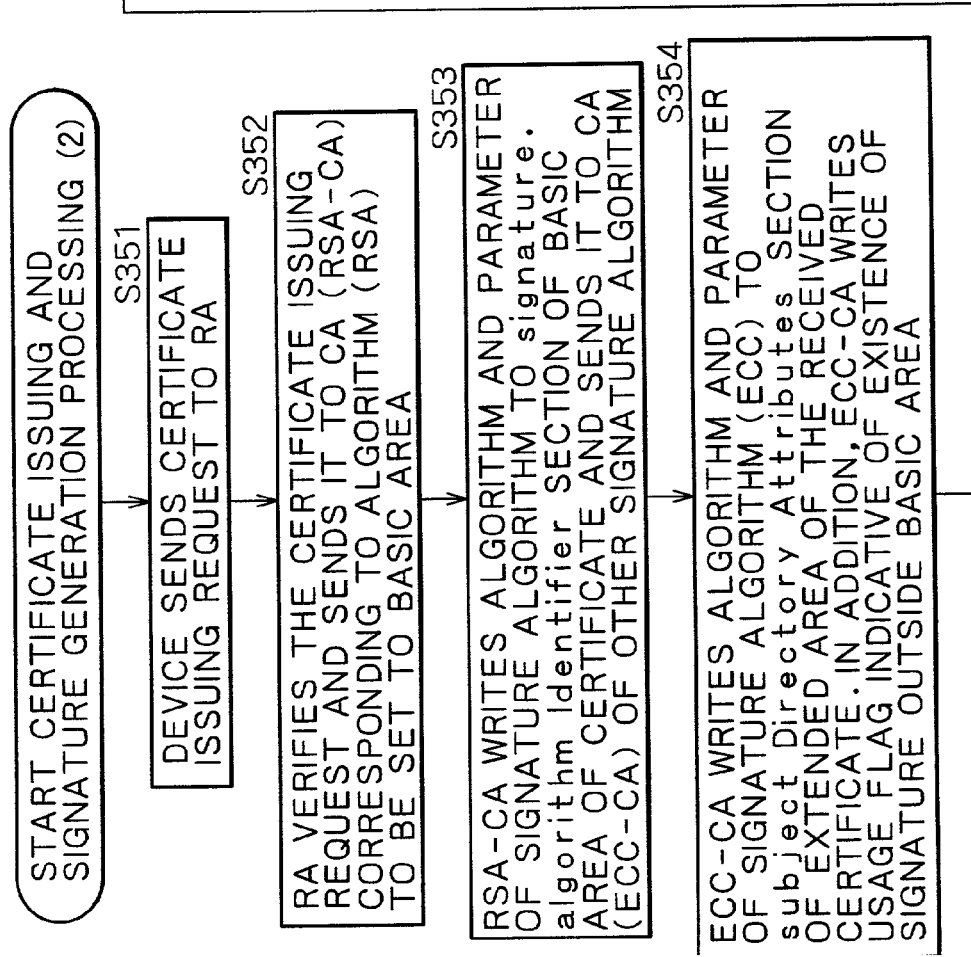
FIG. 15 is a flowchart (example 2) describing public key certificate issuing and signature processing procedures.

The following describes the issuing and signature generation processing of the multi-signed public key certificate shown in FIG. 13 with reference to the flowchart shown in FIG. 15.

First, a device for requesting the issuing of a public key certificate sends a issuing request to a registration authority (RA) in step S351. It should be noted that the registration authority (RA) is a registration authority (RSA&ECC-RA) which accepts the request for issuing a public key certificate having two digital signatures based on RSA signature algorithm and ECC signature algorithm.

Receiving the public key certificate issuing request, the registration authority (RSA&ECC-RA) checks and registers the requesting device and then sends the public key certificate issuing request to the certificate authority (RSA-CA) corresponding to the signature algorithm (in this example, RSA) to be set to the basic area of the public key certificate in step S352. In this processing example, the first signature is also based on RSA algorithm and the second signature on ECC algorithm. It will be apparent that the first signature is based on ECC algorithm and the second signature on the RSA algorithm.

Receiving the public key certificate issuing request from the registration authority, the certificate authority (RSA-CA) generates the requested public key certificate. In doing so, the certificate authority sets RSA algorithm as the signature generating algorithm and its parameters to the basic area of the public key certificate. Further, in step S353, the certificate authority (RSA-CA) sends the generated public key certificate to an certificate authority (ECC-CA) which executes the signature generation processing based on another algorithm.

Receiving the public key certificate data from the certificate authority (RSA-CA), the certificate authority (ECC-CA) sets the signature information such as ECC algorithm and its parameters to the subject Directory Attributes field of the extended area of the received public key certificate and sets a flag indicating that there is a second signature in step S354. It should be noted that the signature information may be stored in any other data recordable area than the subject Directory Attributes field.

Next, the certificate authority (ECC-CA) generates a digital signature from the data (or a message) of the public key certificate on the basis of ECC algorithm. The generated digital signature is stored in an area other than the basic area and the extended area. When the signature generation and storage processing has been completed, the certificate authority (ECC-CA) sends the public key certificate to the certificate authority (RSA-CA) in step S355.

Receiving the public key certificate data from the certificate authority (ECC-CA), the certificate authority (RSA-CA) generates a digital signature from the public key certificate data (or message) on the basis of RSA algorithm, stores the generated digital signature into the signature field of the public key certificate, and sends the resultant public key certificate to the registration authority in step S356.

The registration authority sends the received public key certificate to the requesting device in step S357 and the device stores the received public key certificate into its storage means in step S358.

As described, the public key certificate stores plural digital signatures based on different signature algorithms, so that the signature verification of the public key certificate can be performed by any of the signature algorithms used. In the above-mentioned processing example, only two signature algorithms are described. It will be apparent that digital signatures based on more than two signature algorithms can be generated and stored. Each certificate authority (XXX-CA) may execute signature generation on the basis of a signature algorithm (XXX) of that certificate authority, or transfer the signed public key certificate to other certificate authorities for sequential signing of this public key certificate.

Thus, generating a public key certificate having digital signatures based on different signature algorithms allows two devices each being capable of processing only one ECC and RSA algorithm to execute public key certificate signature verification of each other in cross-certification.

Signature Verification Processing:

In an environment in which a device (or an information processing apparatus) which can process only RSA signature algorithm and a device (or an information processing apparatus) which can process only ECC signature algorithm exist, the following describes each form of the processing for the communication between these devices for cross-certification and encrypted data transfer.

Figure 16:
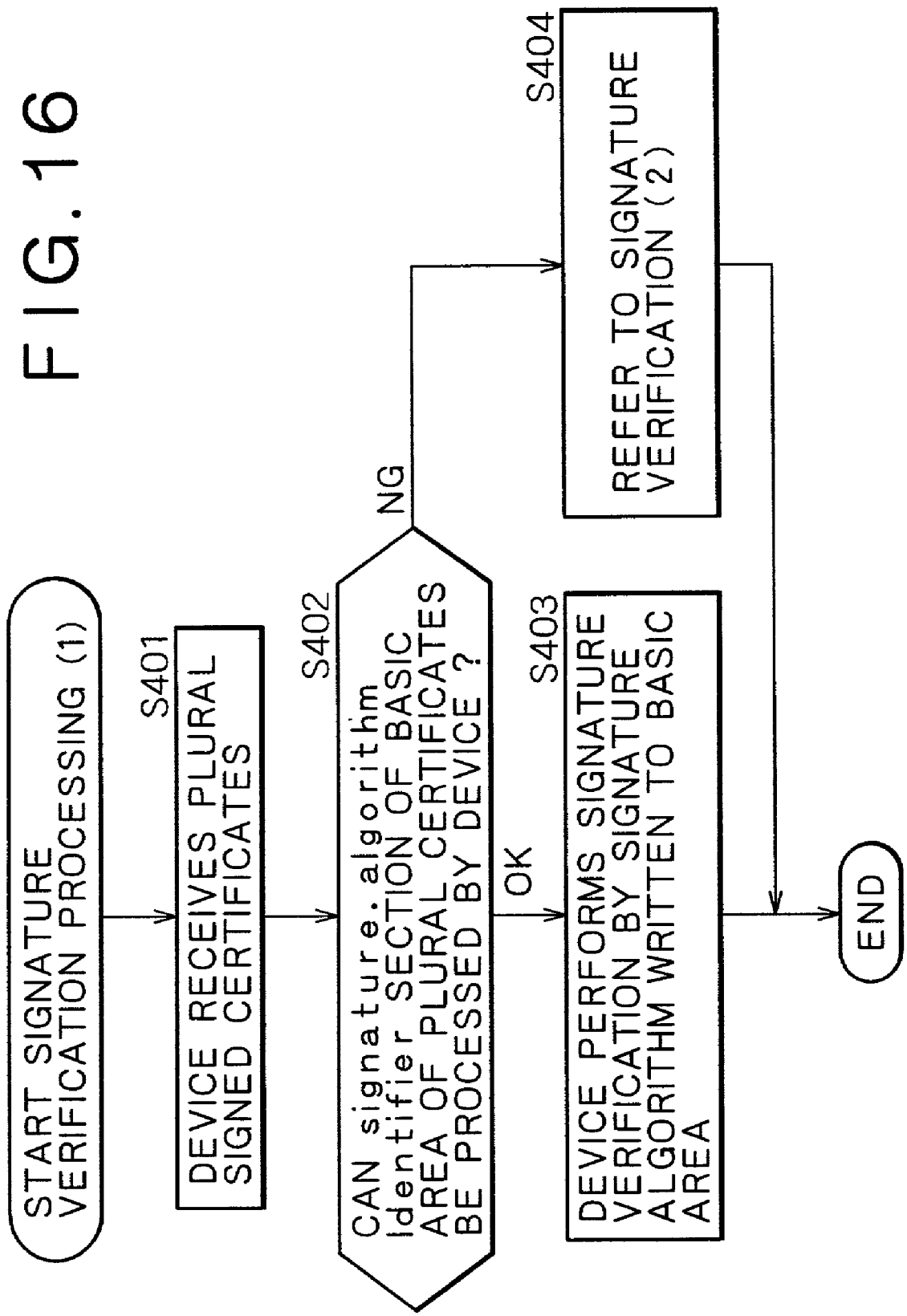
FIG. 16 is a flowchart (example 1-1) describing a public key certificate signature verification processing procedure.
Figure 17:
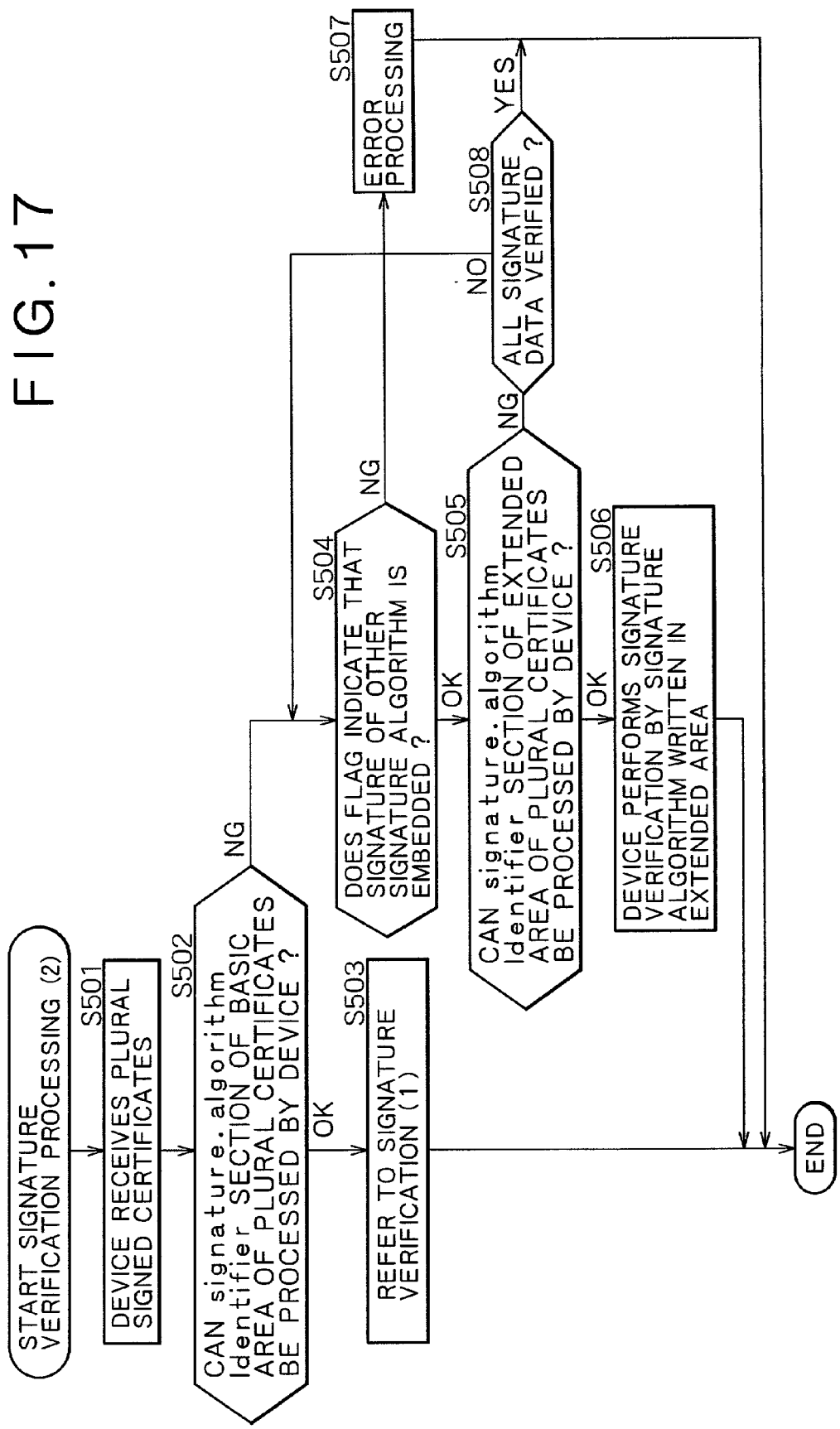
FIG. 17 is a flowchart (example 1-2) describing the public key certificate signature verification processing procedure.

First, an exemplary signature verification processing is described with reference to the flowcharts shown in FIGS. 16 and 17 in which the device can process only one signature algorithm RSA or ECC for example, by use of a multi-signed public key certificate having the format shown in FIG. 12 in which at least the second signature is stored in the extended area and the third, fourth, and so on may be stored.

In step S401, the device receives a multi-signed public key certificate (as shown in FIG. 12) from the other party with which to execute cross-certification for example. Receiving the public key certificate, the device confirms the signature algorithm on the basis of the data stored in the signature.algorithm Identifier field in the basic area of the public key certificate to determine whether the processing (or the verification) can be executed by this device in step S402.

If the processing (or the verification) can be executed by this device, then, in step S403, this device executes the signature verification by applying the verification algorithm based on the signature algorithm recorded to the signature algorithm Identifier field of the basic area. On the other hand, if the processing (or the verification) cannot be executed by this device, then, the device executes the processing of step S404. The processing of S404 is the same as that included in the processing shown in FIG. 17; therefore, the description will be made with reference to FIG. 17.

In step S501, the device receives a multi-signed public key certificate (as shown in FIG 12) from the mate of the communication with which to execute cross-certification. Receiving the public key certificate, the device identifies the signature algorithm used on the basis of the data stored in the signature.algorithm Identifier field of the basic area to verify whether the processing (or the verification) can be executed by this device in step S502.

If the processing (or the verification) can be executed by this device, then, in step S503, this device executes signature verification by applying the signature algorithm recorded to the signature.algorithm Identifier field of the basis area. On the other hand, if this device cannot execute the processing (or the verification), then, in step S504, the device determines by the flag in the extended area of the public key certificate whether there is a digital signature (a second signature based on another signature algorithm.

If the flag indicates no second signature (for example, the flag=0), the device cannot execute signature verification, resulting in an error in step S507.

On the other hand, if the flag indicates the storage of a second signature (for example, the flag=1), the device references the data in the subject Directory Attributes field in the extended area which stores the signature information about the second signature to determine whether this signature algorithm can be processed by this device in step S505. If the signature algorithm can be processed by this device, then, in step S506, this device executes signature verification by applying the verification algorithm based on the signature algorithm recorded to the subject Directory Attributes in the extended area.

If the signature algorithm indicated by the signature information about the second signature is found unexecutable by this device in step S505, then the procedure goes to step S508, in which the device determines whether there is a digital signature based on another signature algorithm. This verification references the third and fourth signature information. As with the second signature information, the device references the subject Directory Attributes field of the extended area.

If a digital signature based on another signature algorithm is found, the device executes the flag information verification in step S504 and the determination of the signature verification in step S505. If the signature verification is found executable, then the device executes the signature verification in step S506. If all signature information is found indicating that the verification is disabled, then, in step S508, the verification for all signature data comes to an end, determining that the verification processing is unexecutable, upon which the processing ends.

As described, if a device which can execute only the digital signatures based on one particular signature algorithm receives a multi-signed public key certificate based on two or more signature algorithms, the device determines whether any of the stored signatures can be verified by this device. The device verifies the signature found verifiable to determine the validity of the received multi-signed public key certificate.

Figure 18:
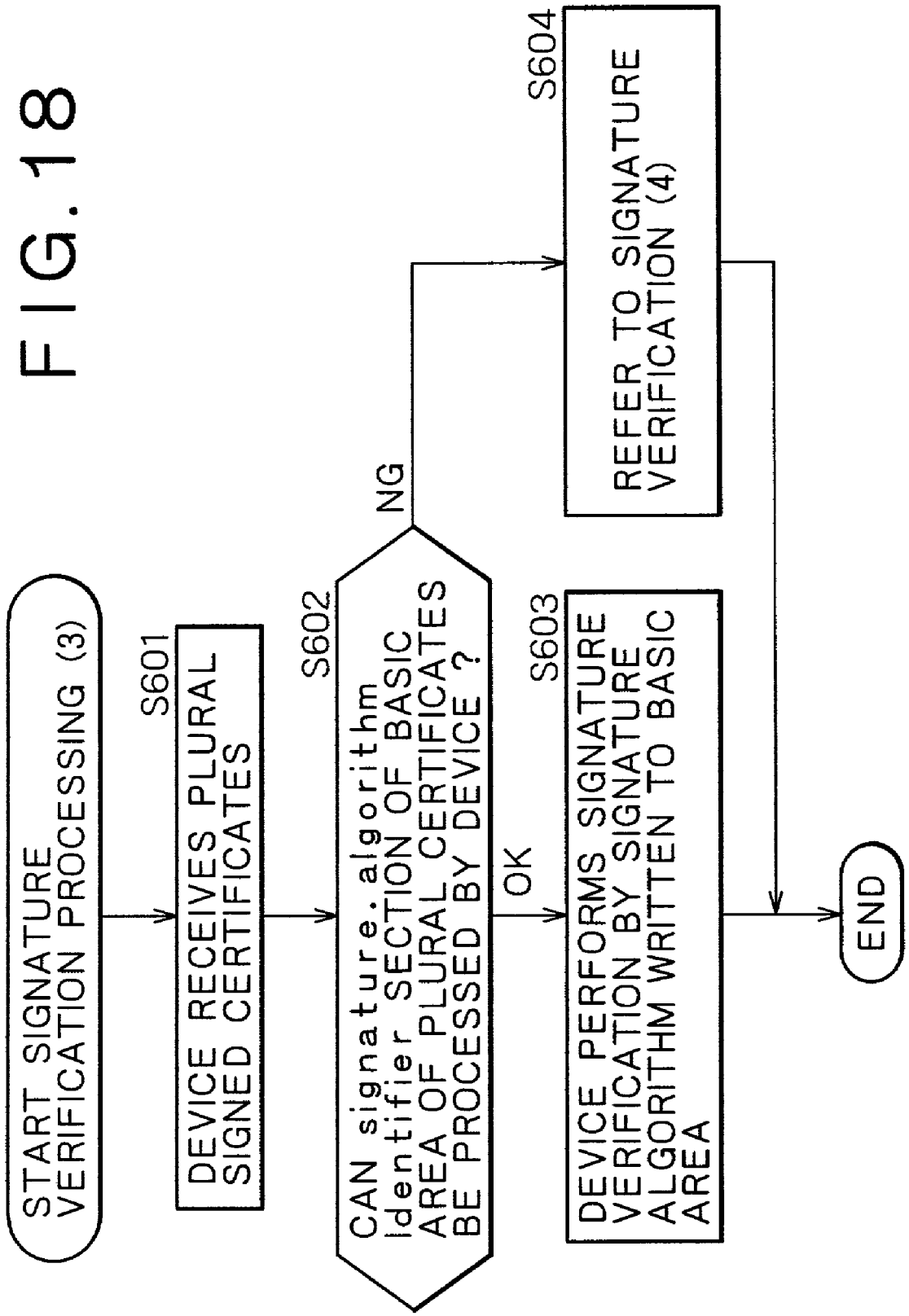
FIG. 18 is a flowchart (example 2-1) describing a public key certificate signature verification processing procedure.
Figure 19:
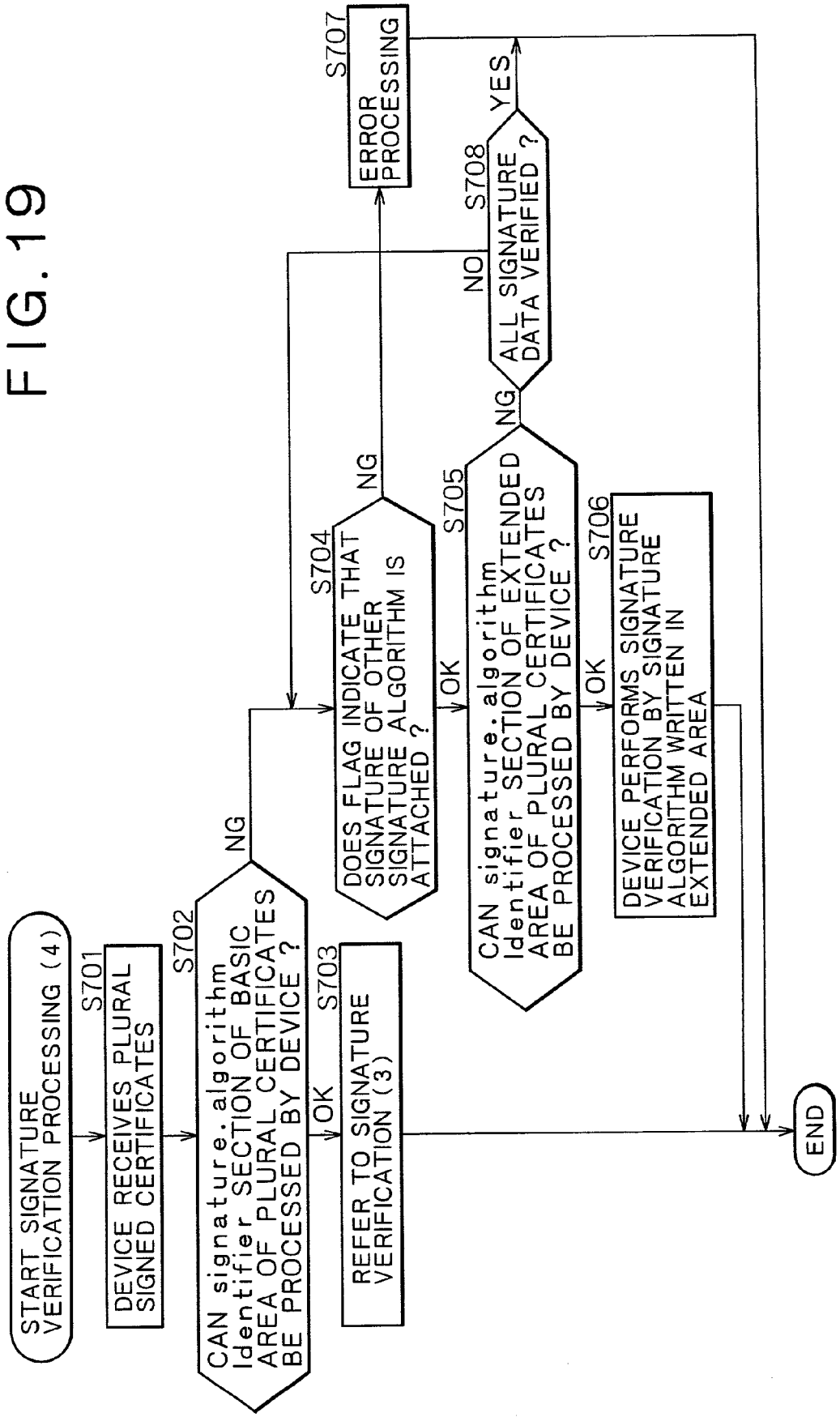
FIG. 19 is a flowchart (example 2-2) describing the public key certificate signature verification processing procedure.

The following describes, with reference to the flowcharts shown in FIGS. 18 and 19, exemplary signature verification processing for verifying a multi-signed public key certificate in which at least a second signature is stored in an area other than the basic area and the extended area and there may be stored third, fourth, and so on signatures, the verification processing being executed by a device which is compatible with only one signature algorithm, RSA or ECC for example.

In step S601, a device receives a multi-signed public key certificate (FIG. 13) from the mate of communication with which cross-certification is to be made. Receiving the public key certificate, the device checks the signature algorithm on the basis of the data stored in the signature.algorithm Identifier field in the basic area of the public key certificate to determine whether the processing (the verification) can be executed by this device in step S602.

If the processing (or the verification) is found executable by this device, then, in step S603, this device executes the signature verification by applying the verification algorithm based on the signature algorithm recorded to the signature-.algorithm Identifier in the basic area. On the other hand, if the processing (or the verification) is found unexecutable by this device, then the device executes the processing of step S604. The processing of step S604 is the same as that shown in FIG. 19, so that it will be describe with reference to FIG. 19.

In step S701 shown in FIG. 19, a device receives a multi-signed public key certificate (FIG. 13) from the mate of communication with which cross-certification is to be made. Receiving the public key certificate, the device checks the signature algorithm on the basis of the data stored in the signature.algonthm Identifier field in the basic area of the public key certificate to determine whether the processing (the verification) can be executed by this device in step S702.

If the processing (or the verification) is found executable by this device, then, in step S703, this device executes the signature verification by applying the verification algorithm based on the signature algorithm recorded to the signature-.algorithm Identifier in the basic area. On the other hand, if the processing (or the verification) is found unexecutable by this device, then, in step S704, the device determines by the flag in the extended area of the public key certificate whether there is a digital signature (a second signature) based on another signature algorithm.

If the flag indicates no second signature (for example, the flag=0), the device cannot execute signature verification, resulting in an error in step S707.

On the other hand, if the flag indicates the storage of a second signature (for example, the flag=1), the device references the data in the subject Directory Attributes field in the extended area which stores the signature information about the second signature to determine whether this signature algorithm can be processed by this device in step S705. If the signature algorithm can be processed by this device, then, in step S706, this device executes signature verification on the signature stored in a signature field (a second signature field) other than the basic area and the extended area by applying the verification algorithm based on the signature algorithm recorded to the subject Directory Attributes in the extended area.

If the signature algorithm indicated by the signature information about the second signature in step S705 is found unexecutable by this device, then, in step S708, the device determines whether there is still another signature based on another signature algorithm. This verification references the third and fourth signature information. As with the second signature information, the device references the subject Directory Attributes field of the extended area.

If a digital signature based on another signature algorithm is found, the device executes the flag information verification in step S704 and the determination of the signature verification in step S705. If the signature verification is found executable, then the device executes the signature verification in step S706. If all signature information is found indicating that the verification is disabled, then, in step S708, the verification for all signature data comes to an end, determining that the verification processing is unexecutable, upon which the processing ends.

As described, if a device which can execute only the digital signatures based on one particular signature algorithm receives a multi-signed public key certificate based on two or more signature algorithms, the device determines whether any of the stored signatures can be verified by this device. The device verifies the signature found verifiable to determine the validity of the received multi-signed public key certificate.

Figure 20:
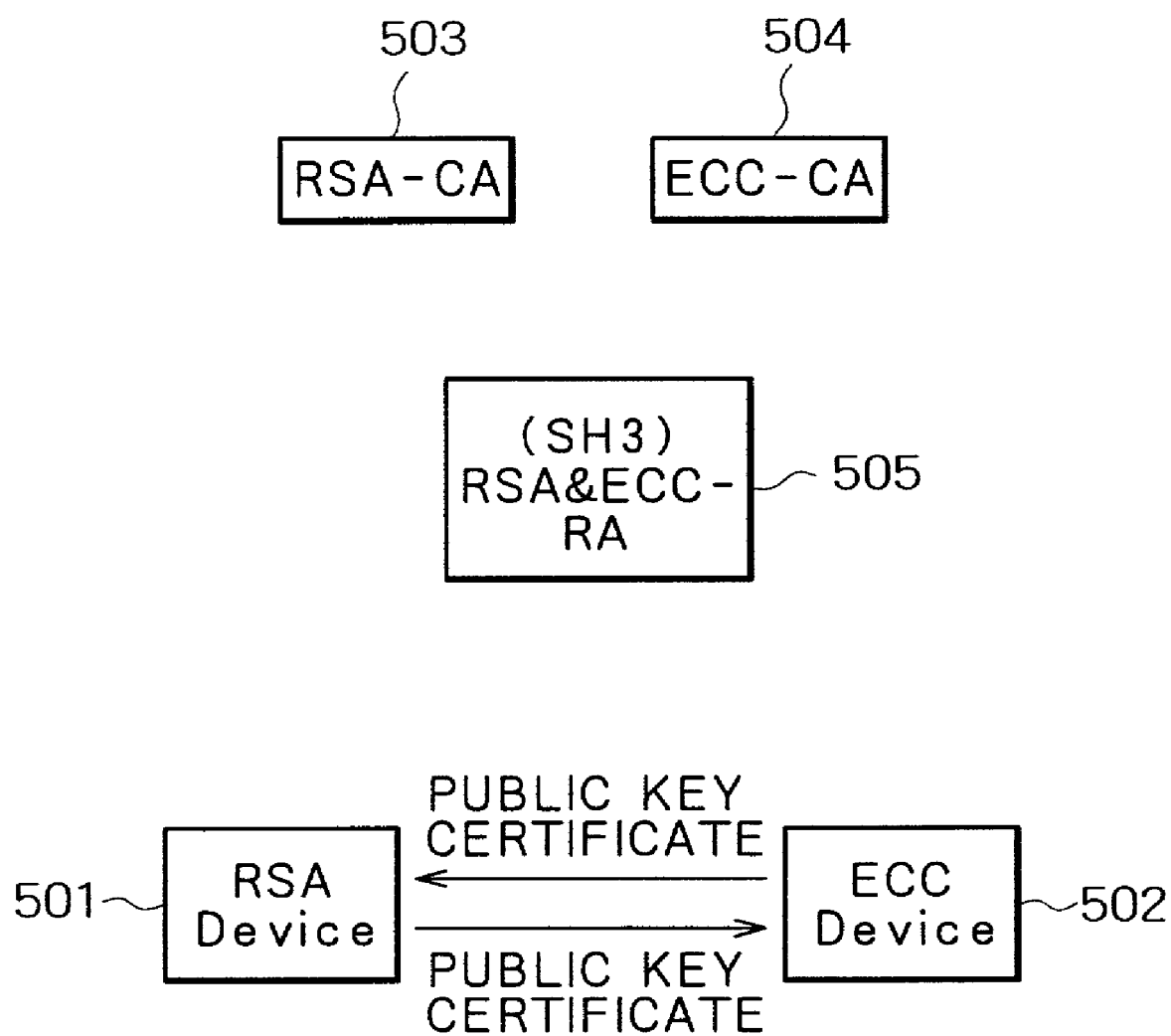
FIG. 20 is a schematic diagram illustrating cross-certification between devices which execute different signature verification processes.

Cross-certification between devices which can process different signature algorithms:

The following describes the cross-certification between particular devices with reference to FIG. 20. Referring to FIG. 20, a RSA device 501 can execute the processing (or the verification) of RSA signature algorithm and an ECC device 502 can execute the processing (or the verification) of ECC signature algorithm.

A RSA certificate authority (RSA-CA) 503 attaches certificate authority signature based on RSA signature algorithm to a public key certificate and issues the resultant public key certificate. An ECC certificate authority (ECC-CA) 504 attaches certificate authority signature based on ECC signature algorithm to a public key certificate and issues the resultant public key certificate.

A RSA & ECC registration authority (RSA&ECC-RA) 505 receives a public key certificate issuing request from each end entity (EE) and requests the RSA certificate authority (RSA-CA) 503 and the ECC certificate authority (ECC-CA) 504 to create a public key certificate (refer to FIGS. 12 and 13) having two certificate authority signatures based on RSA signature algorithm and ECC signature algorithm and sends the resultant public key certificate to each requesting end entity.

Each of the end entities, namely the RSA device 501 and the ECC device 502 shown in FIG. 20 comes to have the public key certificate having two certificate authority signatures based on RSA signature algorithm and ECC signature algorithm issued via the RSA & ECC registration authority (RSA&ECC-RA) 505.

For the cross-certification based on a public key cryptosystem, the RSA device 501 and the ECC device 502 sends a public key certificate of each to the other. Each device executes the signature verification on the public key certificate received from the other device to check the validity of the received public key certificate and then takes the public key of the other device from the public key certificate, executing a procedure of cross-certification.

In this signature verification processing, the RSA device 501 takes the RSA signature from the multi-signed public key certificate and executes the verification processing (refer to FIG. 10) based on RSA signature algorithm and the ECC device 502 takes the ECC signature from the multi-signed public key certificate and executes the verification processing (refer to FIG. 8) based on ECC signature algorithm, thereby verifying the validity of the received public key certificate.

It should be noted that if a third signature algorithm other than RSA signature algorithm and ECC signature algorithm is applied, the cross-certification between the devices can be executed as with shown in FIG. 20 by issuing a multi-signed public key certificate having a signature based on the third signature algorithm.

Certificate Authority (CA) Having Plural Signature Modules:

In the above-mentioned embodiments, each certificate authority is configured to execute the signature processing based on one signature algorithm, RSA or ECC for example. The following describes a configuration in which one certificate authority executes the signature processing based on two or more signature algorithms.

Specifically, the configuration of a certificate authority which serves as a digital certification apparatus having two or more signature modules will be described. In a system having a public key cryptosystem, methods of holding private keys and assuring the security of signature processing present a problem to be solved in constructing a certificate authority. At the same time, the enhanced computing speed of signature processing enhances the system performance of the certificate authority.

One approach to solving the problems of security assurance and enhanced computing speed is the use of a hardware security module (HSM) in holding the signature keys (or private keys) and executing signature processing. Because the HSM is highly tamper-resistant, the use of the HSM plays a significant role in security level enhancement. On the other hand, however, the encryption algorithms to be executed on the HSM are fixed, making it difficult to execute signature key holding and signature processing with other signature algorithms.

In the embodied system, the certificate authority is configured to operate on two or more different signature algorithms, key lengths, and parameters. To be more specific, the certificate authority is configured to have two or more signature modules each based on the HSM or software which executes a different signature algorithm.

Figure 21:
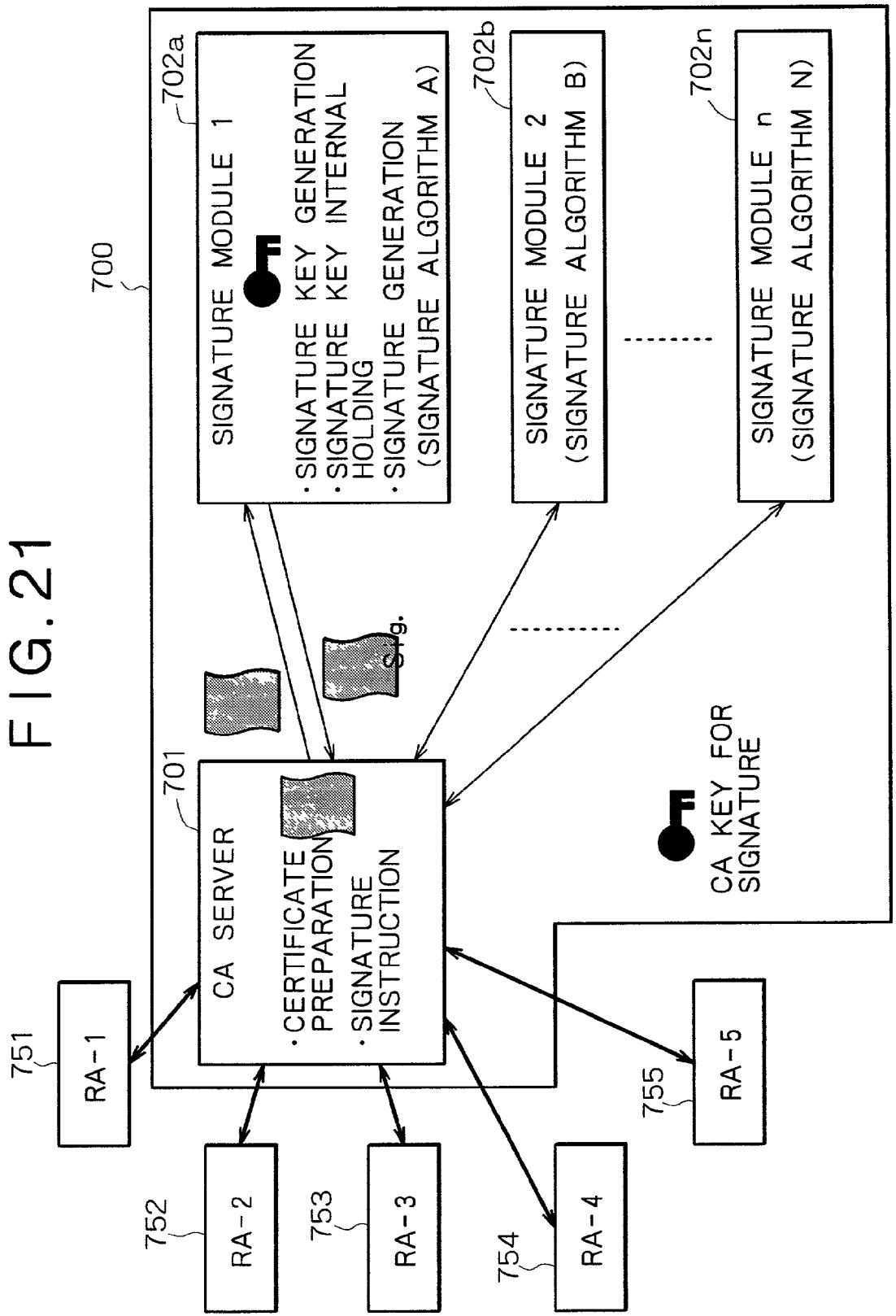
FIG. 21 is a schematic block diagram illustrating a configuration of a certificate authority which can generate plural signatures based on different algorithms.

FIG. 21 shows the processing by the certificate authority serving as a digital certification apparatus having two or more signature modules. A CA server 701 of a certificate authority (CA) 700 receives, via various registration authorities (RAs) 751 through 755, public key certificate issuing requests from end entities such as equipment, servers, users, and service providers which use public key certificates.

Each of the registration authorities (RAs) 751 through 755 specifies RSA cryptosystem or ECC cryptography as its permitted signature algorithm for the public key certificates to be issued to the end entities (EEs) under its management. Each registration authority sends to the certification authority (CA) 700 a request for issuing a public key certificate signed on the basis of one or more specified signature algorithms. Each of the registration authorities (RAs) 751 through 755 requests the issuing of a public key certificate signed on the basis of an encryption algorithm which can be processed at the end entities (EEs) managed by this registration authority, namely the encryption algorithm which can be verified at the end entities. Therefore, each of the registration authorities (RAs) desires to have a different signature algorithm.

The public key certificate issuing request is accepted by the CA server 701 of the certification authority (CA) 700. With reference to a table listing the registration authorities (RAs) 751 through 755 of the CA server and the types of applied signature algorithms, the CA server selects a corresponding signature module from signature modules 702a through 702n and sends the generated public key certificate and a signature execution instruction to the selected signature module.

Receiving the public key certificate and the signature execution instruction, the signature module executes signature processing on the basis of a signature algorithm (for example, RSA or ECC) executable by this module and returns the signed public key certificate to the CA server 701. Receiving the signed public key certificate from the signature module, the CA server 701 sends the received public key certificate to the requesting registration authority (RA).

Each of the signature modules 702a through 702n stores the certificate authority signature key based on the signature algorithm for signature processing from the outside or generates this key on its own and executes signature processing by use of this signature key. Each of the signature modules 702a through 702n is configured as a dedicated processor or a CPU-based module for executing signature processing by the HSM or a software program which can execute signature algorithms. Each of the signature modules 702a through 702n is tamper-resistant and executes signature processing on the basis of a signature key on a message based on the components of the public key certificate generated by the CA server 701. In what follows, the processing block having signature modules is described as a HSM; however, the HSM may be replaced with a dedicated processor for executing signature processing by a program which can execute signature algorithms or a CPU-based module which executes signature processing by software.

Examples of signature processing to be executed by the signature modules 702a through 702n include RSA, ECC, and DSS (Digital Signature Standard). Further, the computing speed and security level of the signature processing depends on the key length applied in each cryptosystem. The key lengths include 512 bits, 1024 bits, and 2048 bits for RSA, 160 bits, 192 bits, arid 224 bits for ECC, each being currently in use. With ECC, in elliptic curve $y^2=x^3+ax+b$ on field F(p) (where, p is prime number or exponent of 2), an algorithm for signature processing is determined by characteristic p of field, orders r, a, and b, and base point (Gx, Gy) on the curve, on which the security level also depends.

By configuring a certificate authority which can execute two or more signature algorithms, the single certificate authority can create a public key certificate having two or more signatures, thereby making it unnecessary for each public key certificate to pass through two or more certificate authorities.

Figure 22:
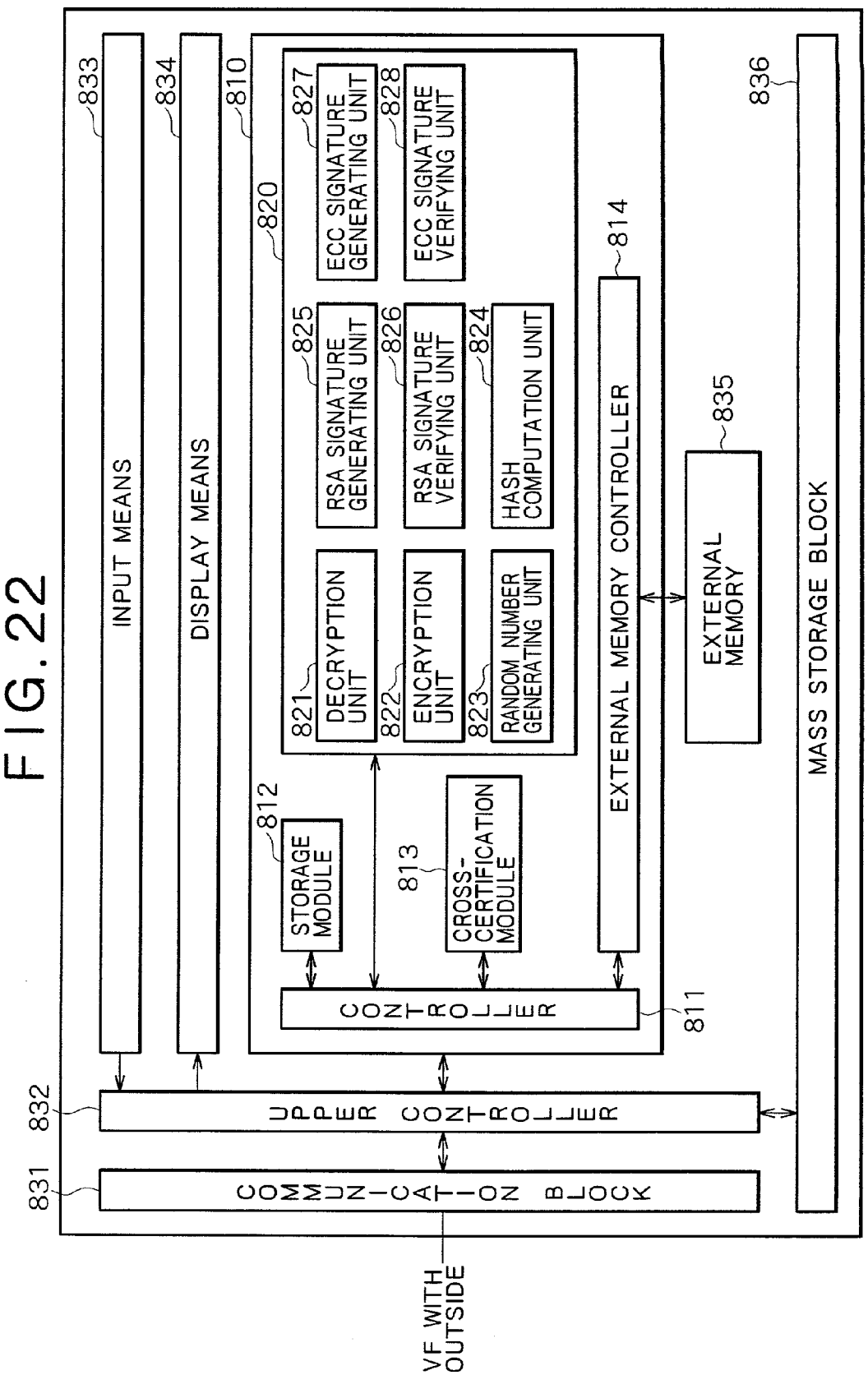
FIG. 22 is a schematic block diagram illustrating a device configuration capable of executing signature verification based on different algorithms.
Figure 23:
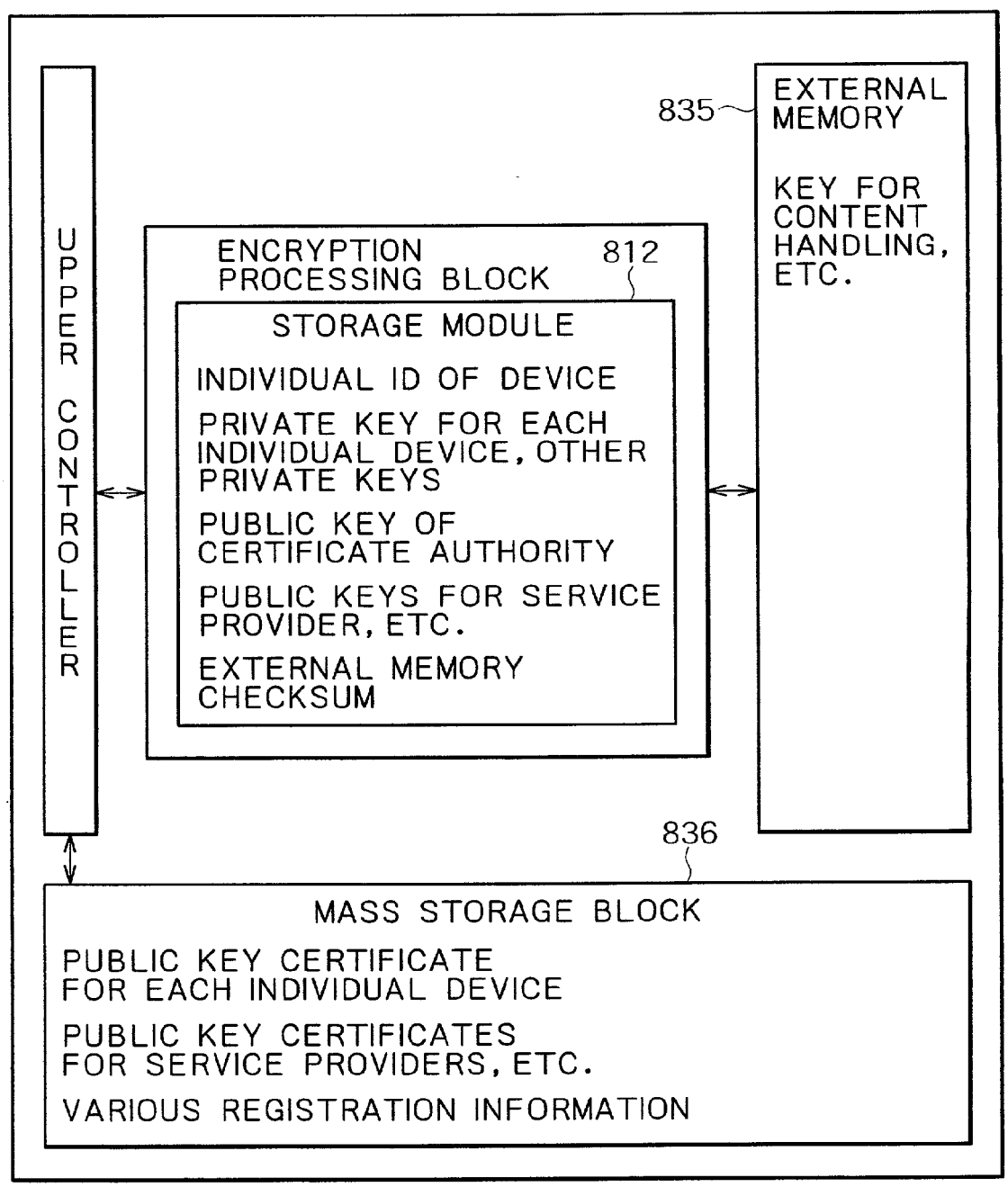
FIG. 23 is a diagram illustrating data storage by storage means of the device capable of executing signature verification based on different algorithms.

Device (Information Processing Apparatus) Configuration:

The following describes, with reference to FIGS. 22 and 23, a configuration in which the device (or the information processing apparatus) of an end entity (EE) which uses a public key certificate issued by a certificate authority (CA) can execute the processing (or the verification) of two or more signature algorithms.

Referring to FIG. 22, there is shown a block diagram of a device configuration of an end entity (EE). As shown, the device has a communication block 831 for executing communication with other devices, content providers, and registration authorities (RAs), an upper controller 832 for controlling the data input/output processing of the entire device, input means 833 including a mouse and keyboard, display means 834 such as CRT or LCD, an encryption processing block 810 for executing signature verification, certification, encryption, and decryption, an external memory 835 for storing the key information for use in content encryption and decryption, and a mass storage block 836 for storing the public key certificate of this device, the public key certificates of service providers, and encrypted content.

The encryption processing block 810 has a controller 811 for controlling the entire encryption processing block, a storage module 812 for storing the information such as device identifier (ID) and device-unique private key, a cross-certification module 813 for executing a cross-certification processing program, an external memory controller 814 for controlling access to an external memory 835, and an encryption/decryption module 820 for executing encryption and decryption.

The encryption/decryption module 820 has a decryption unit 821 for decrypting content and data, an encryption unit 822 for encrypting content and data, a random number generating unit 823 for generating random numbers for use in executing encryption, signature processing, and key generation, a hash computation unit 824 for executing a hash computation for encryption, signature processing, and key generation, a RSA signature generating unit 825 for executing RSA signature generation, a RSA signature verification unit 826 for executing RSA signature verification, an ECC signature generating unit 827 for executing ECC signature generation, and an ECC signature verification unit 828 for executing ECC signature verification.

Referring to FIG. 23, there is shown data to be stored in each of the storage means of the device. The mass storage block 836 stores a device-unique public key certificate. This public key certificate is issued by the certificate authority described with reference to FIGS. 11 through 13 and has one or more certificate authority signatures.

The mass storage block 836 also stores the public key certificates of service providers, content providers, and other devices with which this device communicates. These public key certificates are also issued by certificate authorities and have each at least one certificate authority signature. In addition, the mass storage block 836 stores encrypted content and registration information.

The external memory 835 stores content keys for encrypting and decrypting content, for example.

The storage block 812 in the encryption processing block stores a device identifier (ID), a device-unique private key, other private keys, for example, private keys for use as an encryption key in common key cryptosystem, a certificate authority public key for use in verification of public key certificate, a service provider public key for decrypting encrypted data provided by service providers, and a checksum for use as verification data associated with the data stored in the external memory.

As shown in FIG. 22, this device is configured to process both RSA signature algorithm and ECC signature algorithm. Therefore, this device can execute signature verification processing if the public key certificate received from the mate of communication for cross-certification and encrypted data communication with other devices or service providers has a digital signature based on RSA or ECC.

As described, configuring a device (or an information processing apparatus) which is capable of processing (or verifying) two or more signature algorithms allows, in most cases, the verification of a related-art single-signed public key certificate other than the above-mentioned multi-signed public key certificate, thereby allowing the secure cross-certification and encrypted communication with various devices and providers on the basis of public key certificate verification.

While the preferred embodiments of the present invention have been described using specific terms, such description is for illustrative purposes only, and it is to be understood that changes and variations may be made without departing from the spirit or scope of the appended claims.

As described and according to the public key certificate issuing system, public key certificate issuing method, information processing apparatus, information recording medium, and program storage medium associated with the present invention, a novel configuration is provided in which, a public key certificate storing plural signatures based on different signature algorithms such as RSA and ECC are issued and each device selects a signature which can be processed (namely, verified) by itself and verifies the selected signature. Consequently, the novel configuration allows the devices each being capable of verifying only a different signature algorithm to verify the public key certificates of the other devices, so that each device can perform public key certificate verification in the cross-certification and encrypted data communication not only with the other devices having public key certificates attached with signatures based on the same signature algorithm as that of each device, but also with the other devices or providers having public key certificates attached with signatures based on different signature algorithms from that of each device, thereby significantly enhancing the reliability in communication.

What is claimed is:

1. A public key certificate issuing system comprising:
    a certificate authority for issuing a public key certificate of an entity which uses said public key certificate; and
    a registration authority for sending a public key certificate issuing request received from an entity under control to said certificate authority;
    said certificate authority being constituted by a plurality of certificate authorities each executing a different signature algorithm, transferring a public key certificate between said plurality of certificate authorities in response to said public key certificate issuing request received from said registration authority, attaching a digital signature on message data constituting said public key certificate in accordance with said different signature algorithm at each certificate authority, and issuing a multi-signed public key certificate storing a plurality of signatures based on different signature algorithms,
    wherein said multi-signed public key certificate includes at least a basic area and an extended area, the basic area storing information identifying a first different signature algorithm executed by a first of the plurality of certificate authorities, and the extended area storing information identifying a second different signature algorithm executed by a second of the plurality of certificate authorities, and
    wherein first and second signatures are generated by respectively applying the first and second different signature algorithms to information in both the basic area and the extended area.

2. The public key certificate issuing system according to claim 1, wherein said plurality of certificate authorities include a Rivest-Shamir-Adleman certificate authority for executing signature generation processing based on a Rivest-Shamir-Adleman signature algorithm and an elliptic curve cryptography certificate authority for executing signature generation processing based on an elliptic curve cryptography algorithm, said signatures stored in said multi-signed public key certificate including a signature based on said Rivest-Shamir-Adleman signature algorithm and a signature based on said elliptic curve cryptography signature algorithm.

3. The public key certificate issuing system according to claim 1, wherein at least one of said plurality of certificate authorities has a configuration for executing processing of storing a generated signature and signature information including signature algorithm information associated with said generated signature into an extended area of said public key certificate.

4. The public key certificate issuing system according to claim 1, wherein at least one of said plurality of certificate authorities has a configuration for executing processing of storing a generated signature into an area other than the basic area and the extended area of said public key certificate and storing signature information including signature algorithm information associated with said generated signature into said extended area.

5. The public key certificate issuing system according to claim 1, wherein at least one of said plurality of certificate authorities has a configuration for executing processing of storing, into said public key certificate, flag information indicating whether at least two signatures are included in said public key certificate.

6. A public key certificate issuing method having a certificate authority for issuing a public key certificate of an entity which uses said public key certificate and a registration authority for sending a public key certificate issuing request received from an entity under control to said certificate authority to issue said public key certificate in response to said public key certificate issuing request from said registration authority, said certificate authority being constituted by a plurality of certificate authorities each executing a different signature algorithm, including the steps of:

transferring a public key certificate between said plurality of certificate authorities in response to said public key certificate issuing request received from said registration authority;

attaching digital signatures on message data constituting said public key certificate in accordance with said different signature algorithm at each certificate authority; and issuing a multi-signed public key certificate storing a plurality of signatures based on different signature algorithms, wherein said multi-signed public key certificate includes at least a basic area and an extended area, the basic area storing information identifying a first different signature algorithm executed by a first of the plurality of certificate authorities, and the extended area storing information identifying a second different signature algorithm executed by a second of the plurality of certificate authorities, and wherein attaching digital signatures includes generating first and second signatures by respectively applying the first and second different signature algorithms to information in both the basic area and the extended area.

7. The public key certificate issuing method according to claim 6, wherein at least one of said plurality of certificate authorities executes a step of generating a signature for a signed public key certificate by applying a signature algorithm which is different from that attached to said signed public key certificate and attaching the generated signature to said signed public key certificate.

8. The public key certificate issuing method according to claim 6, wherein said plurality of certificate authorities include a Rivest-Shamir-Adleman certificate authority for executing signature generation processing based on a Rivest-Shamir-Adleman signature algorithm and an elliptic curve cryptography certificate authority for executing signature generation processing based on an elliptic curve cryptography signature algorithm, said Rivest-Shamir-Adleman certificate authority executes signature generation processing based on said Rivest-Shamir-Adleman signature algorithm, said elliptic curve cryptography certificate authority executes signature generation processing based on said elliptic curve cryptography signature algorithm, and said multi-signed public key certificate, including a signature based on said Rivest-Shamir-Adleman signature algorithm and a signature based on said elliptic curve cryptography signature algorithm, is issued.

9. The public key certificate issuing method according to claim 6, wherein at least one of said plurality of certificate authorities executes processing of storing a generated signature and signature information including signature algorithm information associated with said generated signature into an extended areas of said public key certificate.

10. The public key certificate issuing method according to claim 6, wherein at least one of said plurality of certificate authorities executes processing of storing a generated signature into an area other than the basic area and the extended area of said public key certificate and storing signature information including signature algorithm information associated with said generated signature into said extended area.

11. The public key certificate issuing method according to claim 6, wherein at least one of said plurality of certificate authorities executes processing of storing, into said public key certificate, flag information indicating whether at least two signatures are included in said public key certificate.

12. A program storage medium for providing a computer program for executing public key certificate issuing processing for issuing a public key certificate of an entity which uses said public key certificate, said computer program comprising the steps of:

storing basic data in a basic area of the public key certificate;

storing extended data in an extended area of the public key certificate;

generating a first signature by applying a first signature algorithm to the stored basic data and extended data, the first signature algorithm being executable by a first of a plurality of certificate authorities that each execute a different signature algorithm;

attaching the first digital signature to the public key certificate;

generating, with the use of a second signature algorithm different from that of the first signature attached to said public key certificate, a second signature by applying the second signature algorithm to the stored basic data and extended data, the second signature algorithm being executable by a second of the plurality of certificate authorities; and attaching said second signature to said public key certificate.

* * * * *